United States Patent
Shibata et al.

(10) Patent No.: US 10,214,138 B2
(45) Date of Patent: Feb. 26, 2019

(54) LIGHTING DEVICE FOR VEHICLE

(71) Applicant: KOITO MANUFACTURING CO., LTD., Tokyo (JP)

(72) Inventors: Hiroki Shibata, Shizuoka (JP); Kazutami Oishi, Shizuoka (JP); Koji Uchino, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 38 days.

(21) Appl. No.: 15/306,366

(22) PCT Filed: Apr. 8, 2015

(86) PCT No.: PCT/JP2015/061012
§ 371 (c)(1),
(2) Date: Oct. 24, 2016

(87) PCT Pub. No.: WO2015/163150
PCT Pub. Date: Oct. 29, 2015

(65) Prior Publication Data
US 2017/0043706 A1 Feb. 16, 2017

(30) Foreign Application Priority Data

Apr. 24, 2014 (JP) ................. 2014-090205
Apr. 24, 2014 (JP) ................. 2014-090206

(51) Int. Cl.
*B60Q 1/20* (2006.01)
*F21S 41/00* (2018.01)
(Continued)

(52) U.S. Cl.
CPC ............ *B60Q 1/20* (2013.01); *B60Q 1/0433* (2013.01); *B60Q 1/0441* (2013.01);
(Continued)

(58) Field of Classification Search
CPC ........ B60Q 1/0683; B60Q 1/20; B60Q 1/068; F21S 48/125; F21S 41/25; F21S 41/635; F21S 41/295
See application file for complete search history.

(56) References Cited

U.S. PATENT DOCUMENTS

2012/0201039 A1* 8/2012 Shibata ............... B60Q 1/0683
362/460
2015/0184819 A1 7/2015 Maliar et al.

FOREIGN PATENT DOCUMENTS

EP 1739346 A1 1/2007
EP 2484556 A1 8/2012
(Continued)

OTHER PUBLICATIONS

International Search Report issued in PCT/JP2015/061012, dated Jul. 14, 2015 (3 pages).
(Continued)

*Primary Examiner* — Karabi Guharay
(74) *Attorney, Agent, or Firm* — Osha Liang LLP

(57) ABSTRACT

A lighting device to be mounted on a vehicle has a light source, a projection lens having an optical axis, and disposed so as to allow at least some of light emitted from the light source to pass therethrough, a holder that holds the projection lens, a pivot shaft provided at one of the projection lens and the holder and extending in a direction intersecting with the optical axis of the projection lens, a bearing provided at the other of the projection lens and the holder and that holds the pivot shaft, and an aiming mechanism configured to pivot the projection lens relative to the holder about the pivot shaft.

12 Claims, 19 Drawing Sheets

(51) Int. Cl.
  *F21S 41/25* (2018.01)
  *F21S 41/63* (2018.01)
  *F21S 41/20* (2018.01)
  *F21S 45/47* (2018.01)
  *F21S 41/39* (2018.01)
  *B60Q 1/068* (2006.01)
  *B60Q 1/04* (2006.01)
  *F21S 41/29* (2018.01)
  *F21S 45/10* (2018.01)
  *F21S 45/48* (2018.01)
  *B60Q 1/26* (2006.01)
  *F21S 41/143* (2018.01)

(52) U.S. Cl.
  CPC ............ *B60Q 1/0683* (2013.01); *F21S 41/00* (2018.01); *F21S 41/25* (2018.01); *F21S 41/28* (2018.01); *F21S 41/295* (2018.01); *F21S 41/39* (2018.01); *F21S 41/635* (2018.01); *F21S 45/10* (2018.01); *F21S 45/47* (2018.01); *F21S 45/48* (2018.01); *B60Q 1/2634* (2013.01); *F21S 41/143* (2018.01)

(56) References Cited

FOREIGN PATENT DOCUMENTS

| | | |
|---|---|---|
| EP | 2623370 A2 | 8/2013 |
| JP | S62-14603 U | 1/1987 |
| JP | 2009-012692 A | 1/2009 |
| JP | 2009-230940 A | 10/2009 |
| JP | 2011-088627 A | 5/2011 |
| JP | 2011-108570 A | 6/2011 |
| JP | 3173307 U | 2/2012 |
| WO | 2014/012878 A1 | 1/2014 |

OTHER PUBLICATIONS

Written Opinion of the International Searching Authority issued PCT/JP2015/061012, dated Jul. 14, 2015 (5 pages).

Partial Supplementary European Search Report issued in corresponding European Application No. 15782397.2, dated Oct. 30, 2017 (12 pages).

* cited by examiner

LIGHTING DEVICE FOR VEHICLE

CROSS-REFERENCE TO RELATED APPLICATIONS

This application is a national stage application of PCT/JP2015/061012 filed Apr. 8, 2015, and claims priority to Japanese Patent Application No. 2014-090205 filed on Apr. 24, 2014 and Japanese Patent Application No. 2014-090206 filed on Apr. 24, 2014, the contents of which are incorporated by reference herein in their entirety.

BACKGROUND

Technical Field

The present invention relates to a lighting device to be mounted on a vehicle.

Related Art

As an example of this type of lighting device, there has been known a fog lam where a light source and a projection lens are accommodated in a lamp chamber defined by a housing and a translucent cover. Light emitted from the light source is subjected to a predetermined orientation control by passing through the projection lens, thereby forming a predetermined light distribution pattern in front of a vehicle (e.g., see Patent Document 1).

In this type of lighting device, it is general that a mounting member to a vehicle body is provided in a housing which defines a lamp chamber together with a translucent cover (e.g., see Patent Documents 2 and 3).

CITATION LIST

Patent Document

Patent Document 1: Japanese Patent Laid-Open Publication No. 2011-108570
Patent Document 2: Japanese Patent Laid-Open Publication No. 2011-088627
Patent Document 3: Japanese Utility-Model Registration Publication No. 3173307

SUMMARY

In the configuration that a projection lens is accommodated in a lamp chamber, due to error during product assembly or variation in assembly precision to a vehicle, error from predetermined specification may occur in a reference position of an optical axis of the projection lens. In this case, a desired light distribution pattern may not be obtained. Accordingly, there is a request to provide an aiming mechanism for addressing the error. However, in the case of additionally providing the aiming mechanism, an increase in the size of the lighting device cannot be avoided.

According to one or more embodiments of the present invention, an increase in the size of a lighting device may be suppressed even while including a projection lens and an aiming mechanism for performing the adjustment of an optical axis thereof.

The configuration of a vehicle to which a lighting device is mounted is changed in accordance with the type of vehicle and is regularly changed even for the same type of vehicle. The number, shape and arrangement of the mounting members of the lighting device are obliged to design changes in accordance with the type of vehicle or the regular configuration changes. This fact is a factor causing an increase in component cost and manufacturing cost.

According to one or more embodiments of the present invention, an increase in component cost and manufacturing cost of a lighting device for a vehicle may be suppressed.

A lighting device to be mounted on a vehicle according to one or more embodiments of the present invention includes a light source; a projection lens disposed so as to allow at least some of light emitted from the light source to pass therethough; a holder configured to hold the projection lens; a pivot shaft provided at one of the projection lens and the holder and extending in a direction intersecting with an optical axis of the projection lens; a bearing provided at the other of the projection lens and the holder and configured to holding the pivot shaft; and an aiming mechanism configured to pivot the projection lens relative to the holder about the pivot shaft.

According to this configuration, a reference position of the optical axis of the projection lens is adjusted by directly pivoting the projection lens held in the holder. Therefore, it is possible to suppress an increase in the size of the lighting device even while including the projection lens and the aiming mechanism for performing the adjustment of the optical axis thereof.

A lighting device according to one or more embodiments of the present invention includes a housing defining a portion of a lamp chamber for accommodating the light source, the projection lens, the pivot shaft and the bearing. The aiming mechanism includes a screw, a portion of which can be rotationally operated on the outside of the housing; and a joint which converts the rotation of the screw into a force for pivoting the projection lens about the pivot shaft.

According to one or more embodiments of the present invention, the joint is molded integrally with the projection lens.

In this case, the number of parts can be reduced. When the projection lens and the joint are separately configured, it is possible to improve the molding ease of each part.

A lighting device according to one or more embodiments of the present invention includes a circuit board having a circuit configured to control the turning on/off of the light source. The screw is extended through a portion of the housing. At least a portion of the circuit board is disposed in a space inside the lamp chamber to which the screw is extended.

According to this configuration, a space which is required for the provision of the screw can be effectively utilized, thereby suppressing an increase in the size of the housing. Therefore, it is possible to suppress an increase in the size of the lighting device even while including the projection lens and the aiming mechanism for performing the adjustment of the optical axis thereof.

According to one or more embodiments of the present invention, the screw is extended in a longitudinal direction of the vehicle. According to one or more embodiments of the present invention, the circuit board is disposed such that at least a portion of a main surface faces the screw.

According to this configuration, especially in the vertical direction, a dimension of the housing can be reduced. Generally, a request for miniaturization of the lighting device is strong in the vertical direction rather than in the longitudinal direction. Therefore, it is possible to cope with the request for such miniaturization even while including the projection lens and the aiming mechanism for performing the adjustment of the optical axis thereof.

A lighting device according to one or more embodiments of the present invention includes a reflector configured to reflect the light emitted from the light source in a predetermined direction. The reflector is provided in the holder. The position of the holder to the light source is fixed.

According to this configuration, the orientation of the light emitted from the light source can be easily controlled and this configuration contributes to the miniaturization of the projection lens or the improvement in a degree of freedom in arrangement of the projection lens. Therefore, it is possible to suppress an increase in the size of the lighting device even while including the projection lens and the aiming mechanism for performing the adjustment of the optical axis thereof.

According to one or more embodiments of the present invention, a light emitting surface of the light source faces the projection lens.

According to this configuration, the distance between the light source and the projection lens can be shortened. Therefore, it is possible to suppress an increase in the size of the lighting device even while including the projection lens and the aiming mechanism for performing the adjustment of the optical axis thereof.

A lighting device to be mounted on a vehicle according to one or more embodiments of the present invention includes a light source; a housing defining a portion of a space for accommodating the light source; a translucent cover coupled to the housing so as to allow light emitted from the light source to pass therethrough; and a mounting member, a portion of which is mounted to the vehicle and which supports the housing via the translucent cover.

According to this configuration, when the type, structure or design or the like of the vehicle to which the lighting device is mounted is changed, it is sufficient to change only the configuration of the translucent cover. Specifically, at least one of the number, shape and arrangement of the mounting member and the design of the translucent cover itself may be changed. Since the more expensive housing and the component group mounted to the housing can be shared and generalized, an increase in component cost and manufacturing cost can be suppressed.

According to one or more embodiments of the present invention, the mounting member is molded integrally with the translucent cover.

According to this configuration, the number of parts can be reduced. When the mounting member and the translucent cover are separately configured, it is possible to improve the molding ease of each part.

According to one or more embodiments of the present invention, the mounting member has an opening through which a mounting screw is inserted. A plurality of protrusions is formed around the opening.

According to this configuration, the plurality of protrusions is cut or crushed when the mounting member is fixed to a vehicle body by a fastening member. In any case, the plurality of protrusions serves as a buffering material for absorbing the stress which is applied to the mounting member by the fastening member. Therefore, in an operation of fixing the translucent cover to the vehicle, it is possible to prevent the translucent cover from being cracked due to the stress generated by the tightening of the fastening member. As a result, not only an increase in component cost and manufacturing cost can be suppressed, but also workability is improved.

According to one or more embodiments of the present invention, a groove is formed around each of the plurality of protrusions.

According to this configuration, the debris of the protrusion cut by the fastening member can be received in the grooves. Alternatively, the protrusion, which is deformed by being crushed the fastening member, can be received in the groove. Therefore, a gap is less likely to occur between the fastening member and the mounting member by the cut debris of the protrusion or the deformed protrusion. In this way, the fastening member can be prevented from being excessively tightened. Therefore, the translucent cover can be prevented from being cracked due to the stress generated by the excessive tightening. As a result, not only an increase in component cost and manufacturing cost can be suppressed, but also workability is improved.

According to one or more embodiments of the present invention, the mounting member is provided in a frame body. According to one or more embodiments of the present invention, the translucent cover has an engaging portion which is engageable with the frame body.

According to this configuration, when the type, structure or design or the like of the vehicle to which the lighting device is mounted is changed, it is sufficient to change only the configuration of the mounting member. Specifically, at least one of the number, shape and arrangement of the mounting members and the design of the frame body itself may be changed. In this case, since not only the more expensive housing and the component group mounted to the housing can be shared and generalized but also the translucent cover can be shared and generalized, an increase in component cost and manufacturing cost can be suppressed.

According to one or more embodiments of the present invention, the lighting device includes a buffering member sandwiched between the frame body and the translucent cover.

According to this configuration, when the mounting member provided in the frame body is fixed to a vehicle body by a fastening member, the buffering member absorbs the stress which is applied to the translucent cover via the frame body. Therefore, in an operation of fixing the frame body to the vehicle, it is possible to prevent the translucent cover from being cracked due to the stress generated by the tightening of the fastening member. As a result, not only an increase in component cost and manufacturing cost can be suppressed, but also workability is improved.

DETAILED DESCRIPTION

Hereinafter, embodiments of the present invention will be described in detail with reference to the accompanying drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Meanwhile, in each of the drawings used in the following description, the scale of each member is suitably changed in order to have a recognizable size. Further, "right" and "left" used in the following description indicate the left and right directions as seen from a driver's seat.

Figure 1:
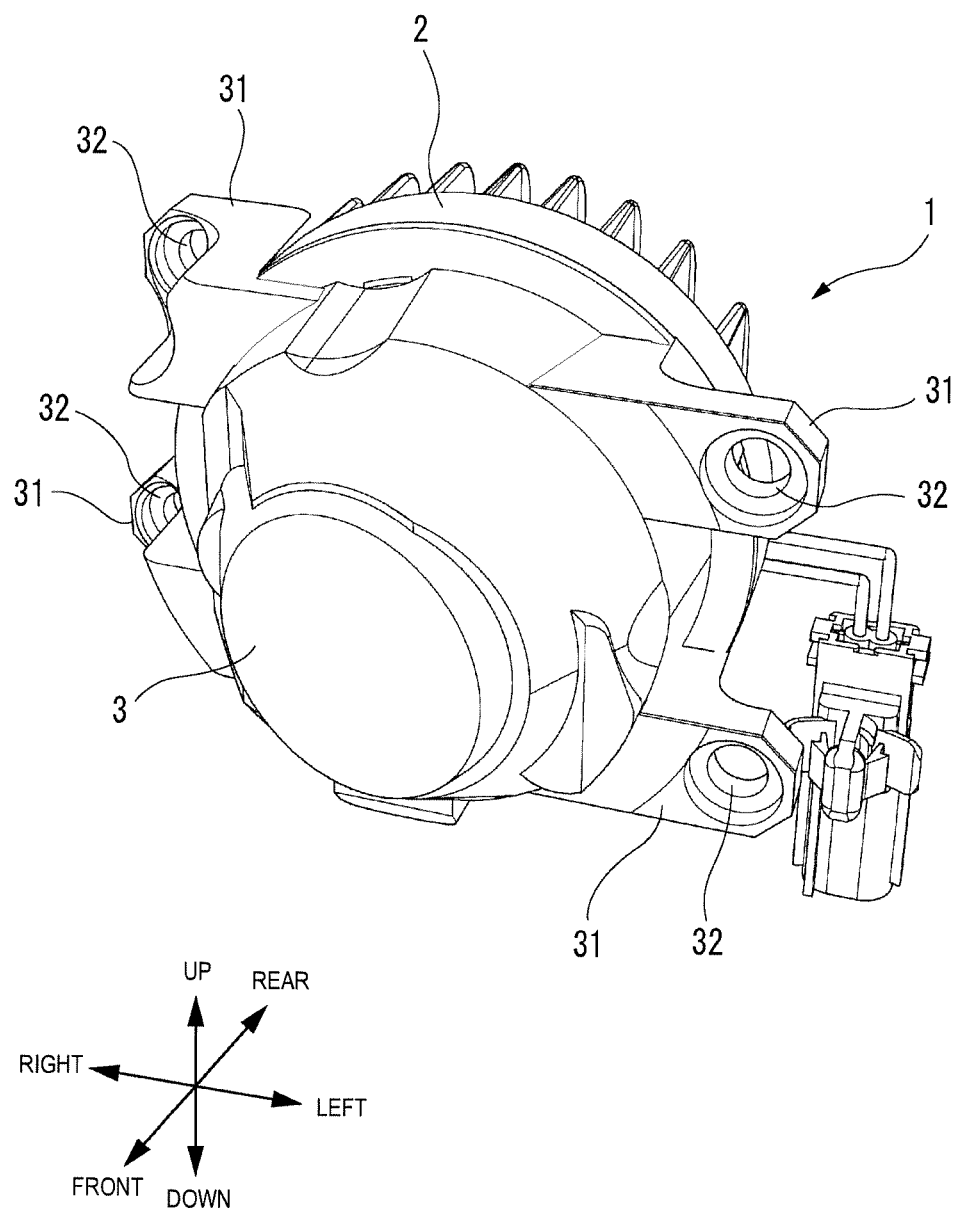
FIG. 1 is a perspective view showing a fog lamp according to a first embodiment.
Figure 2:
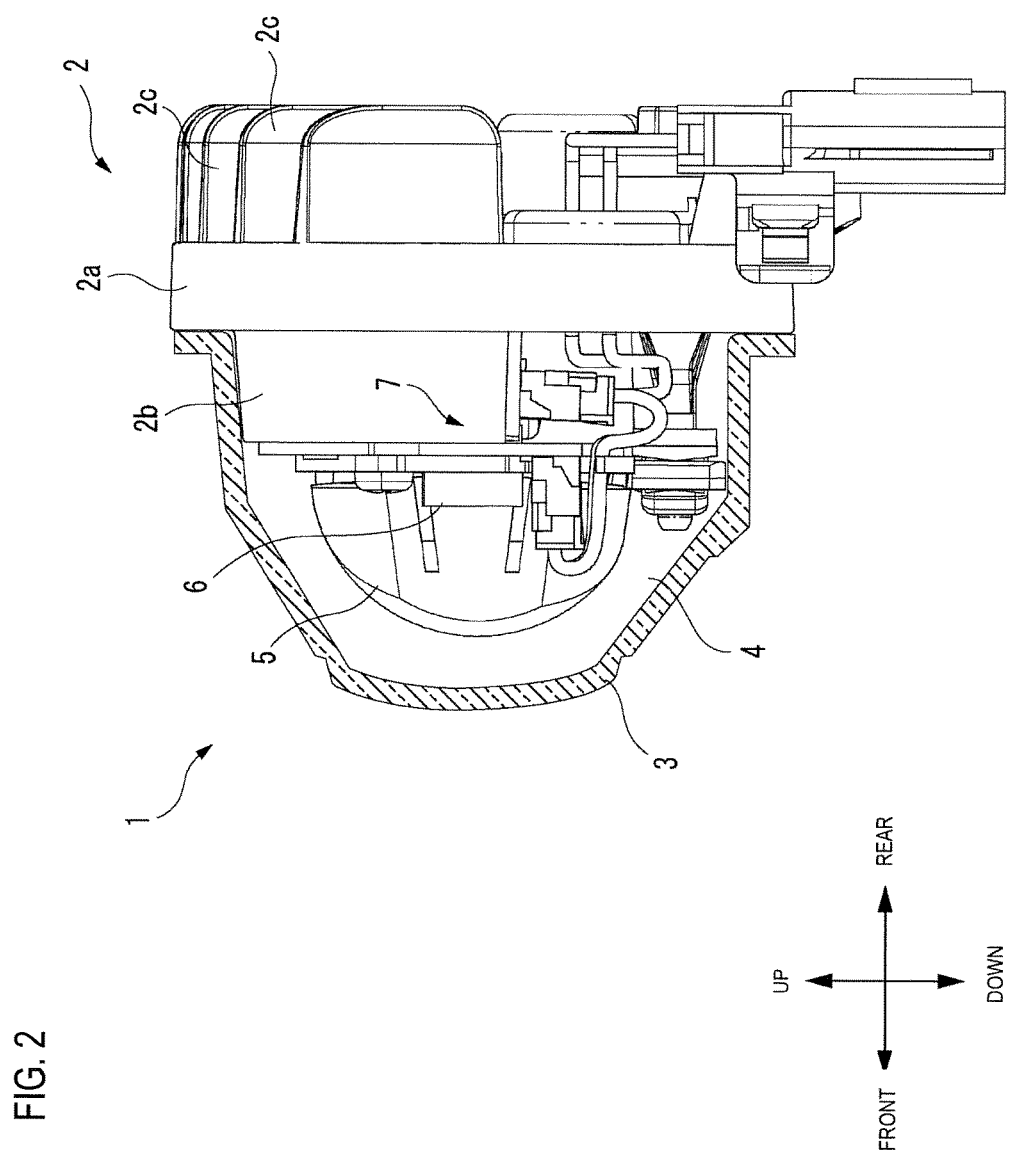
FIG. 2 is a partial sectional left side view showing the fog lamp shown in FIG. 1.

FIG. 1 is a perspective view showing an appearance of a fog lamp 1 (an example of the lighting device) according to a first embodiment, as seen from the left front upper side. The fog lamp 1 includes a housing 2 and a translucent cover 3. FIG. 2 shows a left side view of the fog lamp 1, in which only the translucent cover 3 is shown in a sectional view. The translucent cover 3 is mounted to the housing 2, thereby defining a lamp chamber 4.

The housing 2 includes a back plate 2a, a support table 2b and a plurality of heat-dissipation plates 2c. The back plate 2a has a disc shape so as to minimize the occupying area when installed to a vehicle. The support table 2b is provided in front of the back plate 2a and accommodated in the lamp chamber 4. The plurality of heat-dissipation plates 2c is provided on the rear surface of the back plate 2a and extends in a vertical direction. That is, the plurality of heat-dissipation plates 2c is disposed on the outside of the lamp chamber 4. The back plate 2a, the support table 2b and the plurality of heat-dissipation plates 2c are integrally molded of a high thermal conductivity material such as a metal. That is, the housing 2 defines a portion of the lamp chamber 4 and also serves as a heat sink.

As shown in FIG. 2, the fog lamp 1 includes a projection lens 5, a lens holder 6 and a light source unit 7. The projection lens 5, the lens holder 6 and the light source unit 7 are accommodated in the lamp chamber 4.

Figure 3:
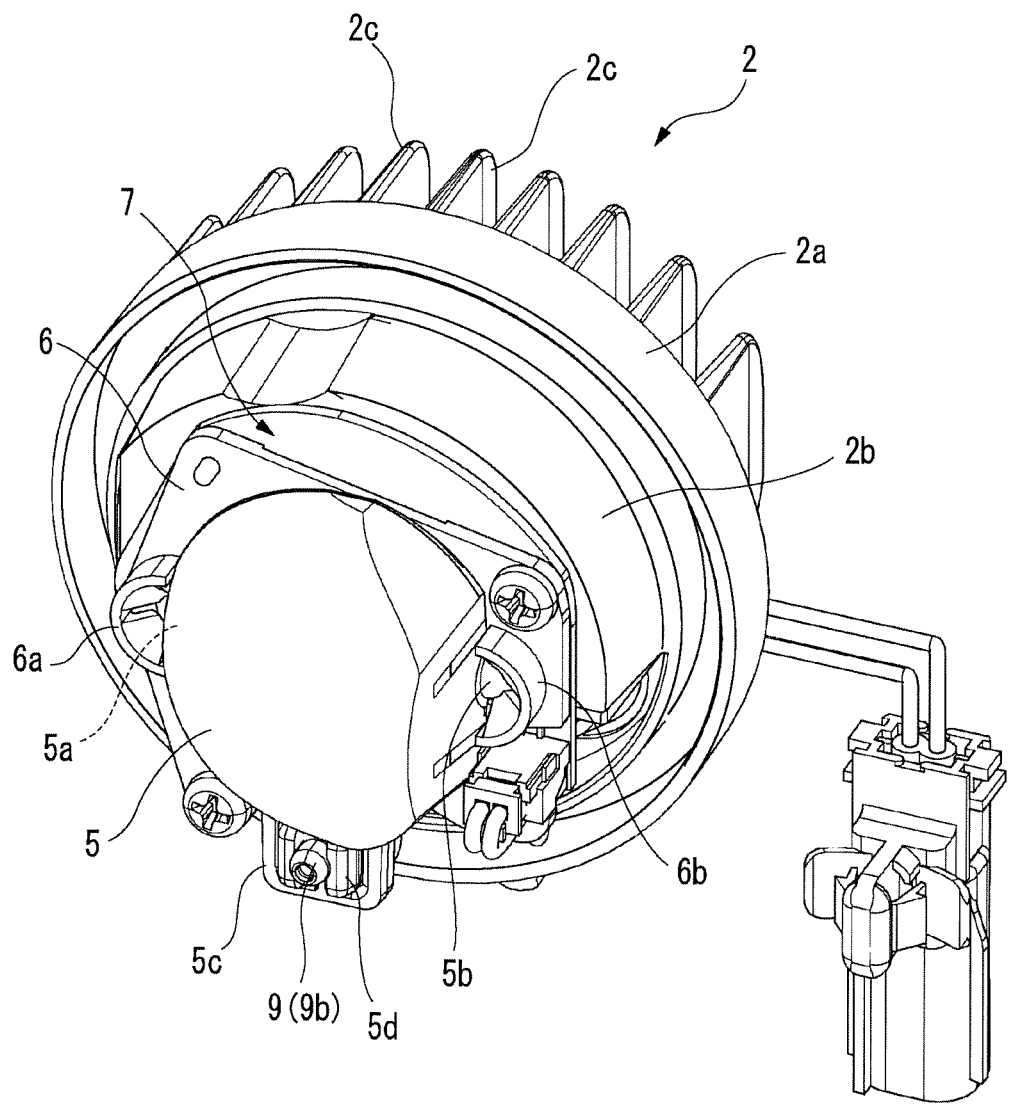
FIG. 3 is a perspective view showing a portion of the fog lamp shown in FIG. 1.
Figure 3:
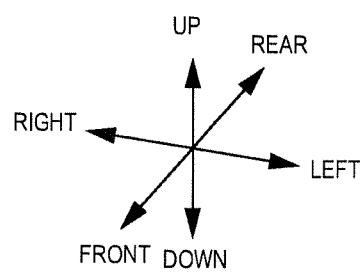
Figure 4:
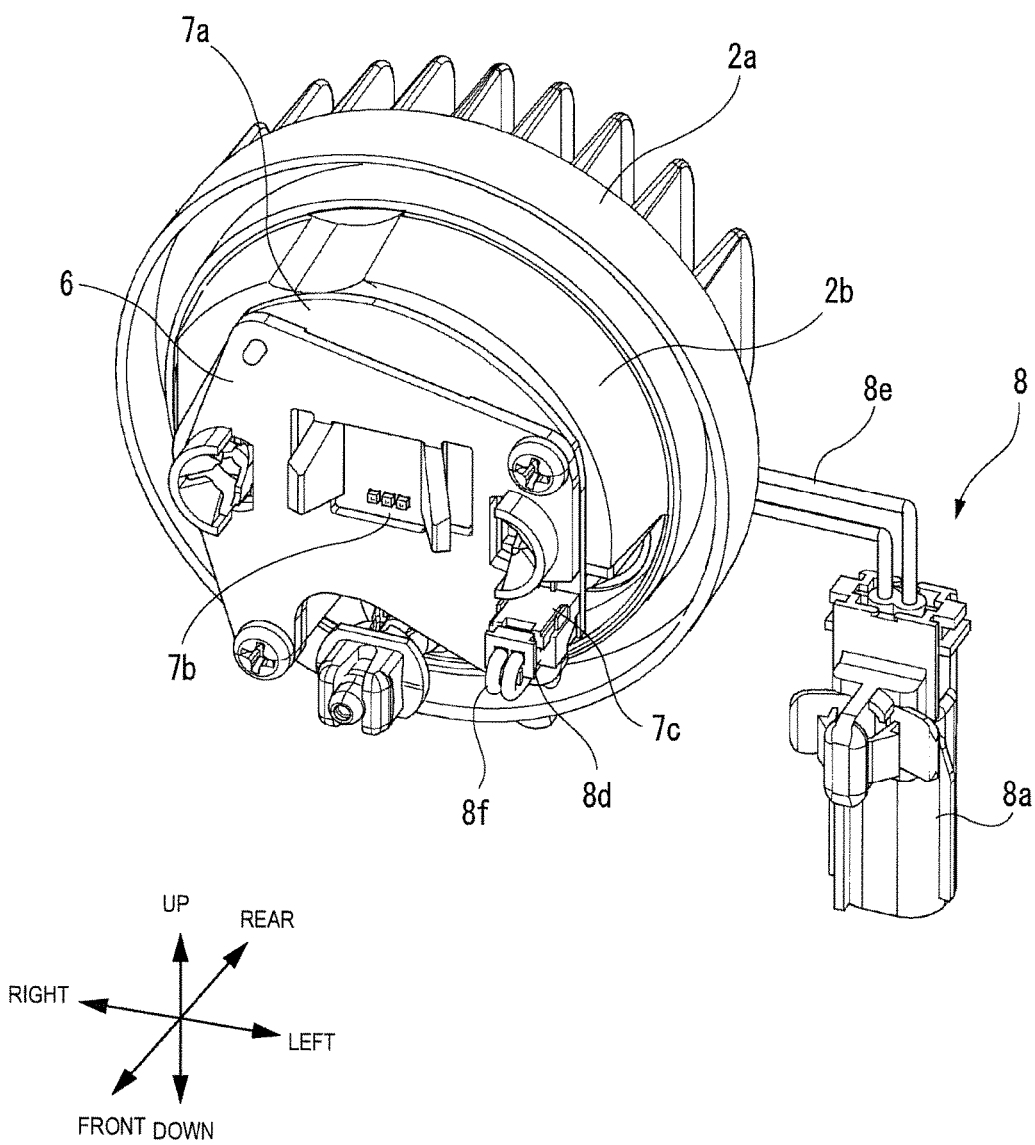
FIG. 4 is a perspective view showing a portion of the fog lamp shown in FIG. 1.

FIG. 3 is a perspective view showing a portion of the fog lamp 1 in which the translucent cover 3 is removed from the state shown in FIG. 1, as seen from the left front upper side. FIG. 4 is a perspective view showing a portion of the fog lamp in which the projection lens 5 is removed from the state shown in FIG. 3, as seen from the left front upper side.

As shown in FIG. 4, the light source unit 7 includes a support board 7a, a light source 7b and a first connector 7c.

The support board 7a is mounted on the front surface of the support table 2b of the housing 2. The light source 7b and the first connector 7c are disposed on the front surface of the support board 7a. A circuit wiring (not shown) is formed in the support board 7a and electrically connects the light source 7b and the first connector 7c.

In the first embodiment, the light source 7b is configured by a plurality of semiconductor light emitting elements. For example, the semiconductor light emitting element may include a light emitting diode, a laser diode and an organic EL element, etc. The number of the light emitting elements is appropriately determined, depending on the specification. Further, a lamp light source may be used as the light source 7b.

Figure 5:
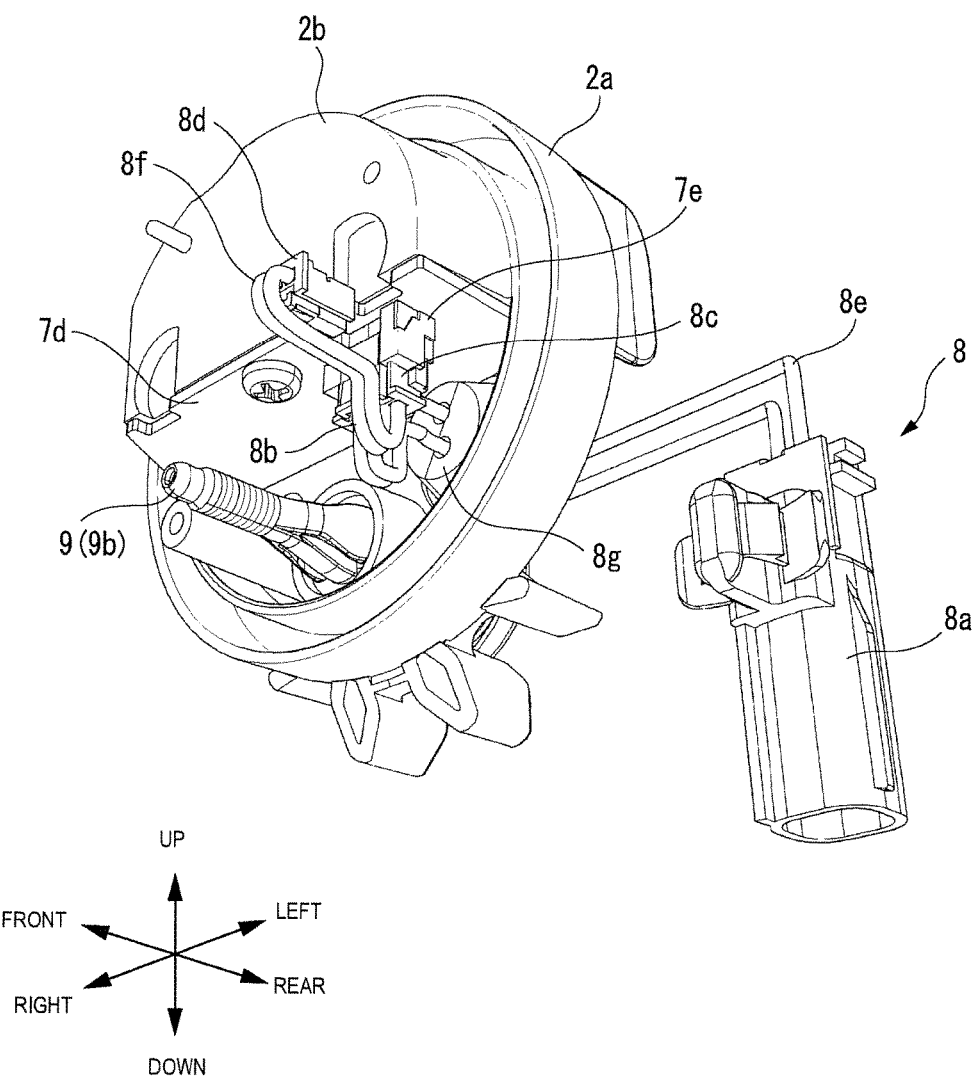
FIG. 5 is a perspective view showing a portion of the fog lamp shown in FIG. 1.
Figure 6:
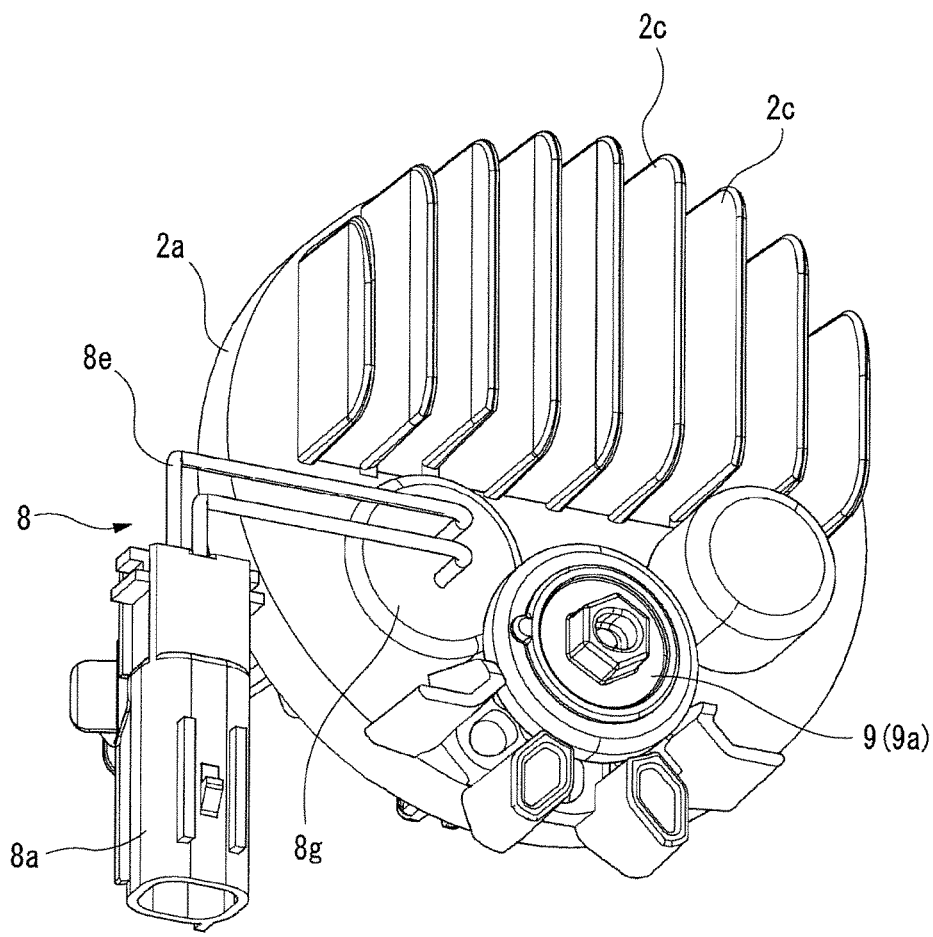
FIG. 6 is a perspective view showing a portion of the fog lamp shown in FIG. 1.
Figure 6:
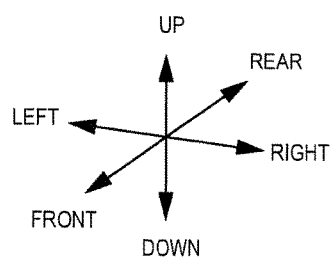

FIG. 5 is a perspective view showing a portion of the fog lamp 1 in which the lens holder 6 and the support board 7a are removed from the state shown in FIG. 4, as seen from the left front lower side. FIG. 6 is a perspective view showing the above state, as seen from the left rear lower side. The light source unit 7 further includes a drive circuit board 7d and a second connector 7e.

The drive circuit board 7d includes a light source drive circuit for controlling the turning on/off of the light source 7b. The second connector 7e is electrically connected to the above circuit. The drive circuit board 7d is mounted on the lower surface of the support table 2b of the housing 2.

As shown in FIGS. 5 and 6, the fog lamp 1 includes a wiring unit 8. The wiring unit 8 includes an external connector 8a, a first internal connector 8b, a second internal connector 8c, a third internal connector 8d, a first connection wire 8e, a second connection wire 8f and a seal member 8g.

The external connector 8a is disposed on the outside of the lamp chamber 4. The external connector 8a is configured to be connectable to a mating connector (not shown) which is connected to a power source or an integrated control unit in a power supplying manner or in a communicable manner. The power source and the integrated control unit are included in the vehicle having the fog lamp 1 mounted thereon. The first internal connector 8b is communicatively connected to the external connector 8a via the first connection wire 8e. The first internal connector 8b is connected to the second connector 7e provided in the drive circuit board 7d. The power supplied from the power source or the control signal transmitted from the integrated control unit is inputted to the light source drive circuit included in the drive circuit board 7d via the external connector 8a, the first internal connector 8b and the second connector 7e.

The first connection wire 8e extends through the seal member 8g. The seal member 8g is fitted into a through hole formed in the back plate 2a below the support table 2b and the plurality of heat-dissipation plates 2c.

The first internal connector 8b and the second internal connector 8c are connected to each other in a power supplying manner or in a communicable manner via the second connection wire 8f. The first internal connector 8b is connected to the second connector 7e provided in the drive circuit board 7d. As shown in FIG. 4, the second internal connector 8c is connected to the first connector 7c provided in the support board 7a. The control signal outputted from the light source drive circuit of the drive circuit board 7d is inputted to the light source 7b via the first internal connector 8b, the second internal connector 8c and the first connector 7c. In this way, the light source 7b performs a desired turning on/off operation.

As shown in FIGS. 3 and 4, the lens holder 6 is fixed to the front surface of the support board 7a. The lens holder 6 holds the projection lens 5. At least some of the light emitted from the light source 7b passes through the projection lens 5. The light passing through the projection lens 5 passes through the translucent cover 3, thereby illuminating the front of the fog lamp 1.

Figure 7:
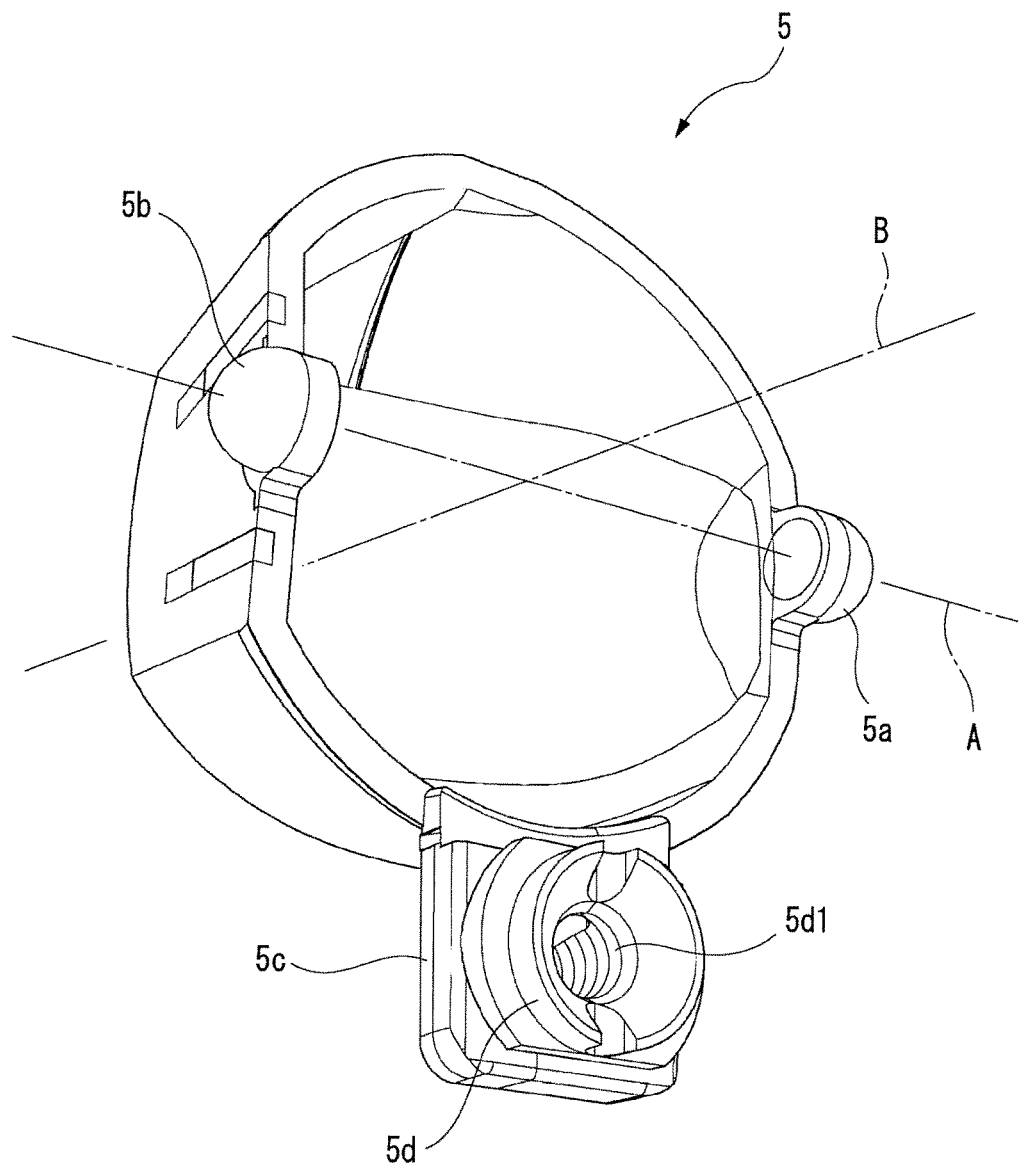
FIG. 7 is a perspective view showing a projection lens included in the fog lamp shown in FIG. 1.
Figure 7:
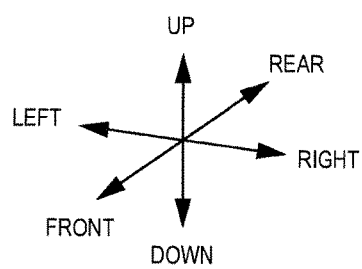
Figure 8:
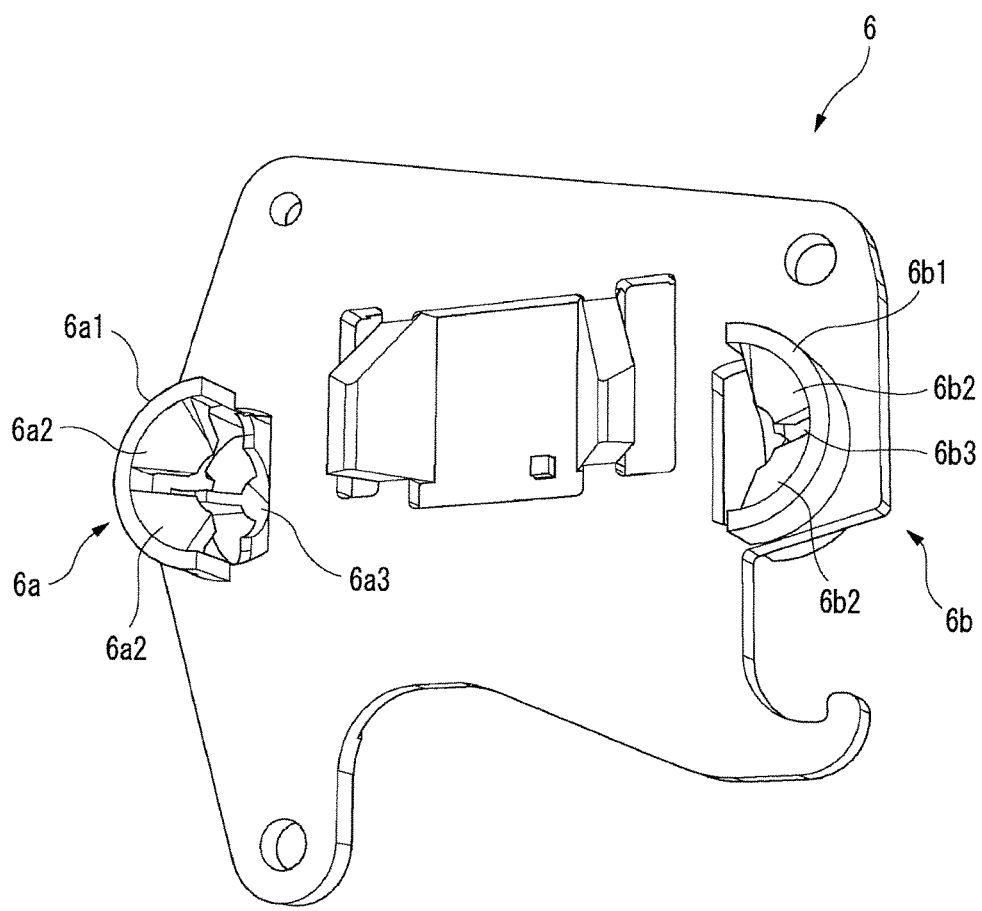
FIG. 8 is a perspective view showing a lens holder included in the fog lamp shown in FIG. 1.

Subsequently, a structure of holding the projection lens 5 in the lens holder 6 will be described with reference to FIGS. 7 and 8. FIG. 7 is a perspective view showing an appearance of the projection lens 5, as seen from the left rear lower side. FIG. 8 is a perspective view showing an appearance of the lens holder 6, as seen from the left front lower side.

As shown in FIG. 7, the projection lens 5 includes a right pivot shaft 5a and a left pivot shaft 5b. The right pivot shaft 5a is disposed on the right side of the projection lens 5. The right pivot shaft 5a is formed to have a hemispherical shape and a spherical surface thereof faces the right side. The left pivot shaft 5b is disposed on the left side of the projection lens 5. The left pivot shaft 5b is formed to have a hemispherical shape and a spherical surface thereof faces the left side. An axial line A connecting the centers of the right pivot shaft 5a and the left pivot shaft 5b extends in a direction perpendicular to an optical axis B of the projection lens 5.

As shown in FIG. 8, the lens holder 6 includes a right bearing 6a and a left bearing 6b. The right bearing 6a and the left bearing 6b are provided on the front surface of the lens holder 6.

The right bearing 6a has a peripheral wall 6a1, a pair of protrusions 6a2 and a curved receiving surface 6a3. The peripheral wall 6a1 protrudes forward from the front surface of the lens holder 6 and extends in a semicircular arc shape. The semicircular arc is opened to the left side. Each of the pair of protrusions 6a2 extends so as to overhang from the front end of the peripheral wall 6a1 toward the inside of the semicircular arc. Each of the pair of protrusions 6a2 can be slightly deflected and deformed to the rear side. The curved receiving surface 6a3 is disposed on the inside of the semicircular arc drawn by the peripheral wall 6a1 and faces the pair of protrusions 6a2. The curved receiving surface 6a3 has a shape along the hemispherical surface of the right pivot shaft 5a.

The left bearing 6b has a peripheral wall 6b1, a pair of protrusions 6b2 and a curved receiving surface 6b3. The peripheral wall 6b1 protrudes forward from the front surface of the lens holder 6 and extends in a semicircular arc shape. The semicircular arc is opened to the right side. Each of the pair of protrusions 6b2 extends so as to overhang from the front end of the peripheral wall 6b1 toward the inside of the semicircular arc. Each of the pair of protrusions 6b2 can be slightly deflected and deformed to the rear side. The curved receiving surface 6b3 is disposed on the inside of the semicircular arc drawn by the peripheral wall 6b1 and faces the pair of protrusions 6b2. Although hidden by the pair of protrusions 6b2 in FIG. 8, the curved receiving surface 6b3 is bilaterally symmetrical with the curved receiving surface 6a3 and has a shape along the hemispherical surface of the left pivot shaft 5b.

The projection lens 5 and the lens holder 6 having the configurations as described above are coupled to each other, as shown in FIG. 3. At this time, the right pivot shaft 5a and the left pivot shaft 5b of the projection lens 5 are held in the right bearing 6a and the left bearing 6b of the lens holder 6, respectively.

Specifically, as the right pivot shaft 5a is pressed against the right bearing 6a, the right pivot shaft 5a enters a region surrounded by the peripheral wall 6a1 while deforming the pair of protrusions 6a2 rearward. When a portion of the hemispherical surface of the right pivot shaft 5a comes into contact with the curved receiving surface 6a3, the pair of protrusions 6a2 returns to its original position, thereby preventing the right pivot shaft 5a from coming out forward. In this way, within the region surrounded by the peripheral wall 6a1, the right pivot shaft 5a can be pivoted in a plane perpendicular to the axial line A shown in FIG. 7.

Similarly, as the left pivot shaft 5b is pressed against the left bearing 6b, the left pivot shaft 5b enters a region surrounded by the peripheral wall 6b1 while deforming the pair of protrusions 6b2 rearward. When a portion of the hemispherical surface of the left pivot shaft 5b comes into contact with the curved receiving surface 6b3, the pair of protrusions 6b2 returns to its original position, thereby preventing the left pivot shaft 5b from coming out forward. In this way, within the region surrounded by the peripheral wall 6b1, the left pivot shaft 5b can be pivoted in a plane perpendicular to the axial line A shown in FIG. 7.

As shown in FIGS. 5 and 6, the fog lamp 1 includes an aiming screw 9. The aiming screw 9 has a head portion 9a and a shaft portion 9b. As shown in FIG. 6, the head portion 9a is disposed below the plurality of heat-dissipation plates 2c on the rear surface of the back plate 2a of the housing 2. That is, the head portion 9a is disposed on the outside of the housing 2. The head portion 9a can be rotationally operated by a predetermined tool. The shaft portion 9b extends into the lamp chamber 4 through the back plate 2a. A screw groove is formed at an outer peripheral surface of the shaft portion 9b.

As shown in FIG. 7, the projection lens 5 has a connection portion 5c and a joint 5d. The connection portion 5c is molded integrally with a lower portion of the projection lens 5 and extends downward from the lower portion. The joint 5d is mounted to the connection portion 5c. A through hole 5d1 is formed in the joint 5d. A screw groove is formed at an inner peripheral surface of the through hole 5d1.

As shown in FIG. 3, the shaft portion 9b of the aiming screw 9 is inserted into the through hole 5d1 of the joint 5d. At this time, the screw groove formed at the outer peripheral surface of the shaft portion 9b is screwed with the screw groove formed at the inner peripheral surface of the through hole 5d1. When the head portion 9a of the aiming screw 9 is rotationally operated by a predetermined tool, the screwed position of the shaft portion 9b and the joint 5d is changed, and thus, the joint 5d is displaced in the longitudinal direction.

Figure 9B:
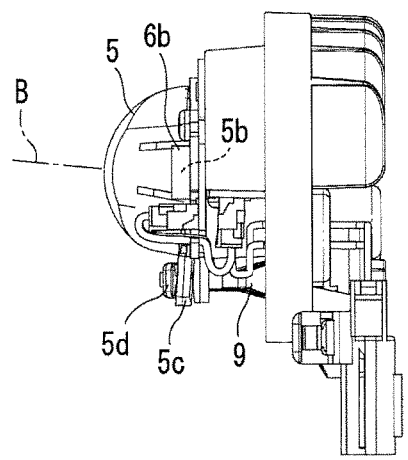
FIGS. 9A-9C are left side views showing an operation of an aiming mechanism included in the fog lamp shown in FIG. 1.
Figure 9A:
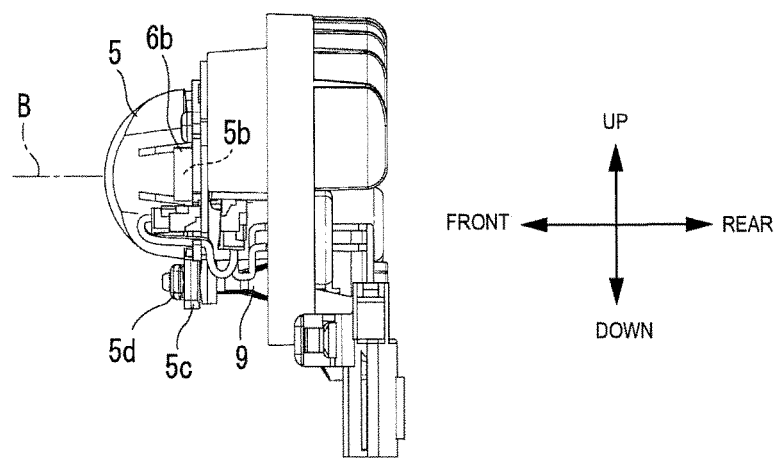
Figure 9C:
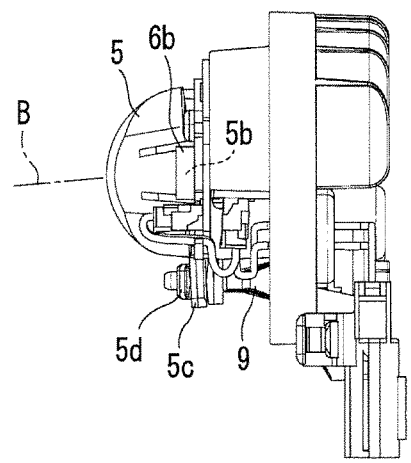

FIGS. 9A-9C are left side views for explaining the movement of the projection lens 5 caused by the rotation of the aiming screw 9. FIG. 9A shows an initial state.

When the aiming screw 9 is rotated to the left side from the above state, the joint 5d is displaced to the front. Along with this, the connection portion 5c of the projection lens 5 is pressed forward. At this time, the right pivot shaft 5a and the left pivot shaft 5b of the projection lens 5 are pivoted rearward in the right bearing 6a and the left bearing 6b of the lens holder 6, respectively. Accordingly, as shown in FIG. 9B, the optical axis B of the projection lens 5 is inclined upward.

On the other hand, when the aiming screw 9 is rotated to the right side, the joint 5d is displaced to the rear. Along with this, the connection portion 5c of the projection lens 5 is pressed rearward. At this time, the right pivot shaft 5a and the left pivot shaft 5b of the projection lens 5 are pivoted forward in the right bearing 6a and the left bearing 6b of the lens holder 6, respectively. Accordingly, as shown in FIG. 9C, the optical axis B of the projection lens 5 is inclined downward.

Specifically, the aiming screw 9 and the joint 5d constitute an aiming mechanism for pivoting the projection lens 5 relative to the lens holder 6 about the right pivot shaft 5a and the left pivot shaft 5b. As the head portion 9a of the aiming screw 9 is rotationally operated, the shaft portion 9b is rotated. The joint 5d converts the rotation of the shaft portion 9b into a force for pivoting the projection lens 5. Thus, the reference position in the vertical direction of the optical axis B of the projection lens 5 can be regulated through the rotational operation of the aiming screw 9.

According to the configurations as described above, the reference position of the optical axis B of the projection lens 5 is adjusted by directly pivoting the projection lens 5 held in the lens holder 6. Therefore, it is possible to suppress an increase in the size of the fog lamp 1 even while including the projection lens 5 and the aiming mechanism for performing the adjustment of the optical axis thereof.

Meanwhile, in the aiming mechanism, it is not essential to use the aiming screw which can be operated from the outside of the housing 2. For example, it is possible to adopt a configuration that an actuator connected to the projection lens 5 is provided in the lamp chamber 4 and the projection lens 5 is pivoted relative to the lens holder 6 by the actuator. In this case, it is possible to adopt a configuration that a signal for controlling the actuator is inputted through the wiring unit 8.

As shown in FIG. 7, in the first embodiment, the joint 5d is molded separately from the projection lens 5 and mounted to the connection portion 5c. However, the joint 5d may be integrally molded as a part of the projection lens 5. In this case, the number of parts can be reduced. In the case where the connection portion 5c and the joint 5d are separately configured as in the first embodiment, it is possible to improve the molding ease of each part.

As is apparent from FIGS. 4 and 5, the drive circuit board 7d including the light source drive circuit is disposed in a space inside the lamp chamber 4 to which the aiming screw 9 is extended.

According to this configuration, a space which is required for the provision of the aiming screw 9 can be effectively utilized, thereby suppressing an increase in the size of the housing 2. Therefore, it is possible to suppress an increase in the size of the fog lamp 1 even while including the projection lens 5 and the aiming mechanism for performing the adjustment of the optical axis thereof.

Particularly, in the first embodiment, the drive circuit board 7d is disposed such that a main surface faces the aiming screw 9.

According to this configuration, especially in the vertical direction, a dimension of the housing 2 can be reduced. Generally, a request for miniaturization of the fog lamp 1 is strong in the vertical direction rather than in the longitudinal direction. Therefore, it is possible to cope with the request for such miniaturization even while including the projection lens 5 and the aiming mechanism for performing the adjustment of the optical axis thereof.

Figure 10:
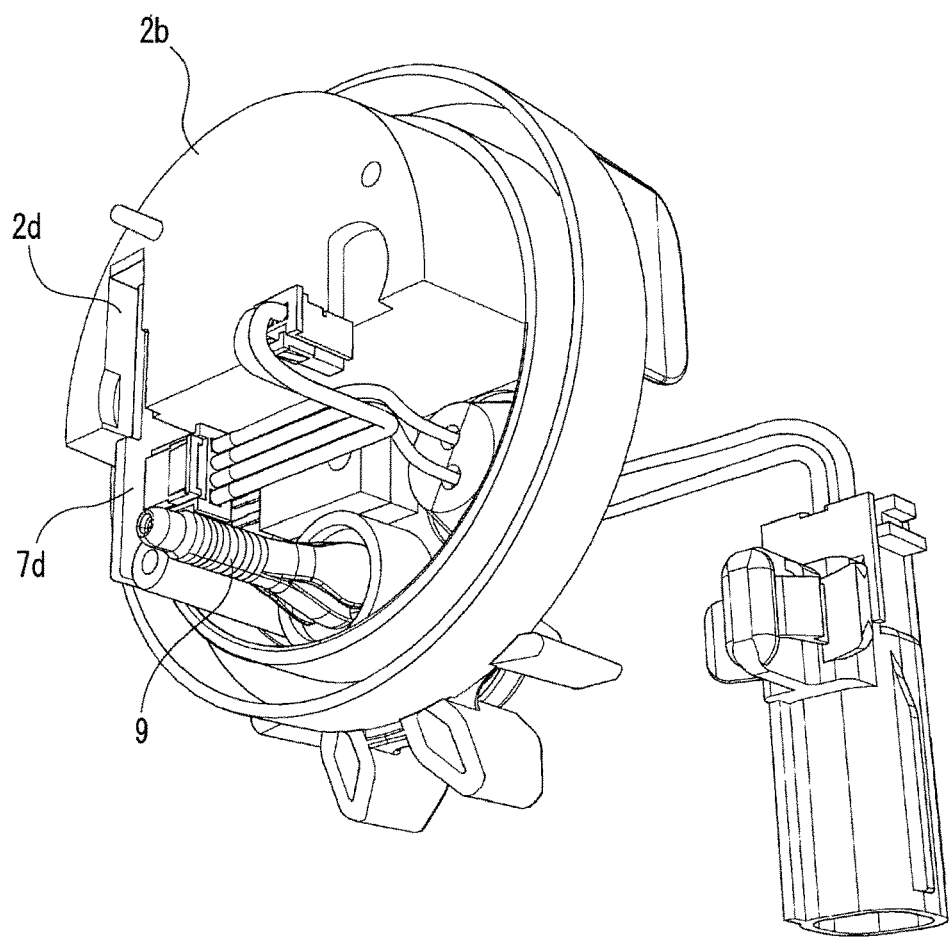
FIG. 10 is a perspective view showing a first modification of the fog lamp shown in FIG. 1.
Figure 10:
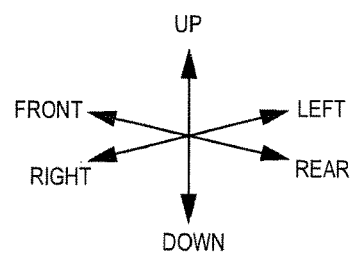

The drive circuit board 7d may be arranged as in a first modification shown in FIG. 10. FIG. 10 is a perspective view corresponding to FIG. 5. In the present modification, a groove 2d is formed in the support table 2b of the housing 2. The drive circuit board 7d is arranged in such a way that a portion is accommodated in the groove 2d in a state where a main surface faces a lateral direction. The portion of the drive circuit board 7d located on the outside of the groove 2d is disposed in a space inside the lamp chamber 4 to which the aiming screw 9 is extended. Further, the drive circuit board 7d is disposed such that the main surface faces the aiming screw 9.

According to this configuration, especially in the lateral direction, a dimension of the housing 2 can be reduced. Generally, a request for miniaturization of the fog lamp 1 is strong in the lateral direction rather than in the longitudinal direction. Therefore, it is possible to cope with the request for such miniaturization even while including the projection lens 5 and the aiming mechanism for performing the adjustment of the optical axis thereof.

As shown in FIG. 8, the lens holder 6 has a pair of reflectors 6c. The pair of reflectors 6c is provided on the front surface of the lens holder 6. As shown in FIG. 4, the position of the lens holder 6 to the light source 7b is fixed. The pair of reflectors 6c is provided in a shape and arrangement to reflect the light emitted from the light source 7b in a predetermined direction.

According to this configuration, the orientation of the light emitted from the light source 7b can be easily controlled and this configuration contributes to the miniaturization of the projection lens 5 or the improvement in a degree of freedom in arrangement of the projection lens 5. Therefore, it is possible to suppress an increase in the size of the fog lamp 1 even while including the projection lens 5 and the aiming mechanism for performing the adjustment of the optical axis thereof.

The number, shape and arrangement of the reflector 6c can be appropriately determined, depending on the specification of the fog lamp 1. The reflector 6c may be omitted, depending on the specification.

As shown in FIG. 1, the translucent cover 3 has four mounting members 31. Each base end of the four mounting members 31 is molded integrally with the translucent cover 3. The four mounting members 31 extend to the side away from the translucent cover 3. An opening 32 is formed at each leading end of the four mounting members 31.

Fastening members (screws or bolts, etc.; not shown) are inserted through the openings 32. The fastening members are coupled to receiving members (screw holes or nuts, etc.) provided on the vehicle side. Each of the four mounting members 31 is fixed to the vehicle by the fastening members. At this time, each of the four mounting members 31 supports the housing 2 via the translucent cover 3.

Figure 11:
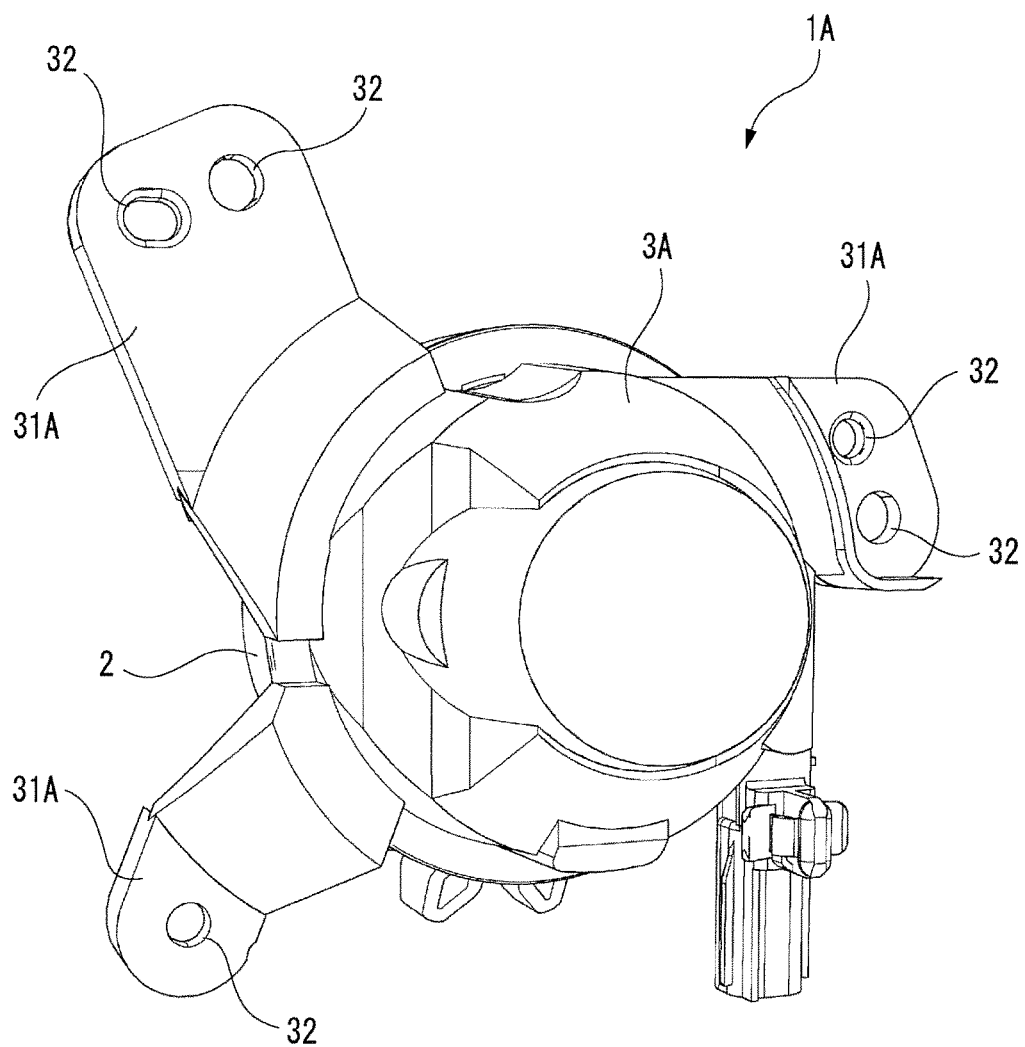
FIG. 11 is a perspective view showing a second modification of the fog lamp shown in FIG. 1.
Figure 11:
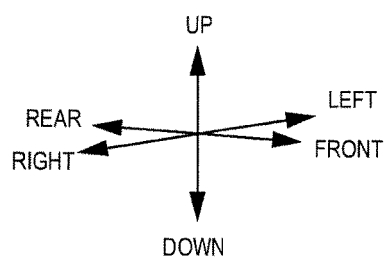

FIG. 11 is a perspective view of a fog lamp 1A according to a second modification, as seen from the front right side. The fog lamp 1A includes a translucent cover 3A. The translucent cover 3A has three mounting members 31A. Each base end of the three mounting members 31A is molded integrally with the translucent cover 3A. The three mounting members 31 extend to the side away from the translucent cover 3A. At least one opening 32 is formed at each leading end of the three mounting members 31A. Each of the three mounting members 31A is fixed to the vehicle by fastening members inserted through the openings 32. At this time, each of the three mounting members 31A supports the housing 2 via the translucent cover 3A.

The mounting members 31A of the translucent cover 3A are configured to be mounted on a vehicle having a configuration different from the vehicle to which the translucent cover 3 shown in FIG. 1 is fixed. Therefore, at least one of the number, shape and arrangement of the mounting members 31A is different from the mounting members 3 of the translucent cover 3. However, the configuration of the coupling portion to the housing 2 is common in the translucent cover 3 and the translucent cover 3A. Accordingly, the fog lamp 1 according to the first embodiment and the fog lamp 1A according to the second modification are different only in the configuration of the translucent cover 3 and the translucent cover 3A and other configurations thereof, i.e., the configuration of the housing 2 is the same as each other.

Namely, according to the configurations as described above, when the type, structure or design or the like of the vehicle to which the fog lamp 1 is mounted is changed, it is sufficient to change only the configuration of the translucent cover 3. Specifically, at least one of the number, shape and arrangement of the mounting members 31 and the design of the translucent cover 3 itself may be changed. Since the more expensive housing 2 and the component group mounted to the housing 2 can be shared and generalized, an increase in component cost and manufacturing cost can be suppressed.

Figure 12A:
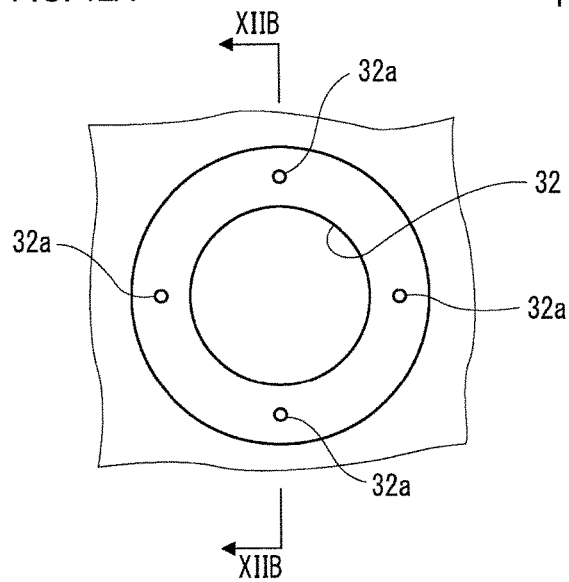
FIGS. 12A-12D are front views showing a portion of the fog lamp shown in FIG. 11.
Figure 12B:
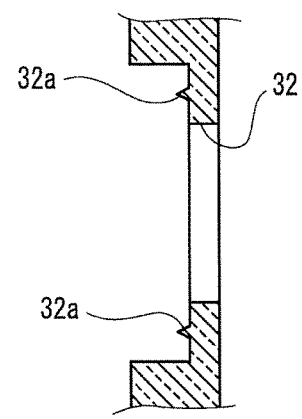

Next, the structure of the openings 32 formed in the mounting members 31 is described with reference to FIGS. 12A-12D. FIG. 12A is a front view of the opening 32 and FIG. 12B is a sectional view taken along a line XIIB-XIIB in FIG. 12A.

As shown in FIGS. 12A-12D, a plurality of protrusions 32a is formed around the opening 32. Each of the plurality of protrusions 32a protrudes toward the front.

According to this configuration, each of the plurality of protrusions 32a is cut or crushed when the mounting member 31 is fixed to a vehicle body by a fastening member (not shown). In any case, the plurality of protrusions 32a serves as a buffering material for absorbing the stress which is applied to the mounting member 31 by the fastening member. Therefore, in an operation of fixing the translucent cover 3 to the vehicle, it is possible to prevent the translucent cover 3 from being cracked due to the stress generated by the tightening of the fastening member. As a result, not only an increase in component cost and manufacturing cost can be suppressed, but also workability is improved.

Figure 12C:
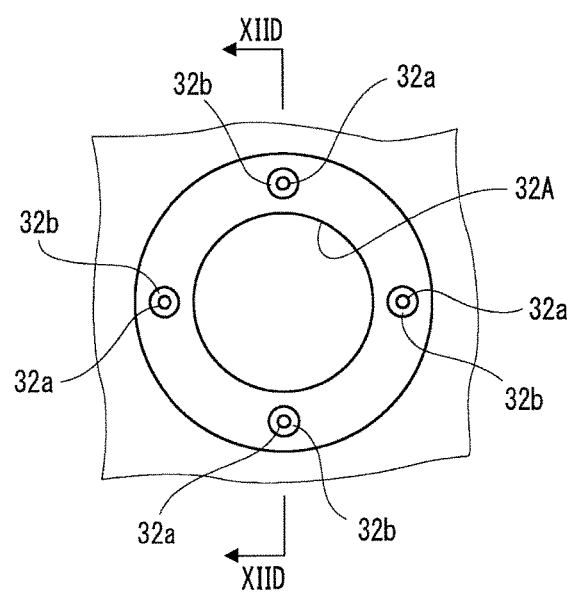
Figure 12D:
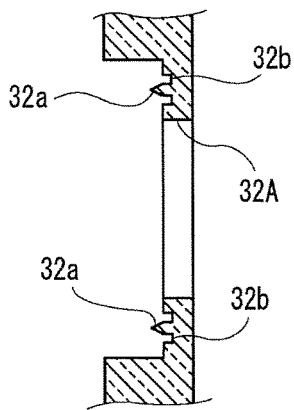

FIG. 12C is a front view of an opening 32A according to a modification and FIG. 12D is a sectional view taken along a line XIID-XIID in FIG. 12C.

A plurality of protrusions 32a is formed around the opening 32A. Each of the plurality of protrusions 32a protrudes toward the front. In the present modification, a groove 32b is formed around each of the plurality of protrusions 32a.

According to this configuration, the debris of the protrusion 32a cut by the fastening member can be received in the grooves 32b. Alternatively, the protrusion 32a, which is deformed by being crushed the fastening member, can be received in the groove 32b. Therefore, a gap is less likely to occur between the fastening member and the mounting member 31 by the cut debris of the protrusion 32a or the deformed protrusion 32a. In this way, the fastening member can be prevented from being excessively tightened and the translucent cover 3 can be prevented from being cracked due to the stress generated by the excessive tightening. As a result, not only an increase in component cost and manufacturing cost can be suppressed, but also workability is improved.

The contents described with reference to FIGS. 12A-12D can be also applied to the openings 32 formed in the mounting members 31A of the translucent cover 3A described with reference to FIG. 11.

Figure 13:
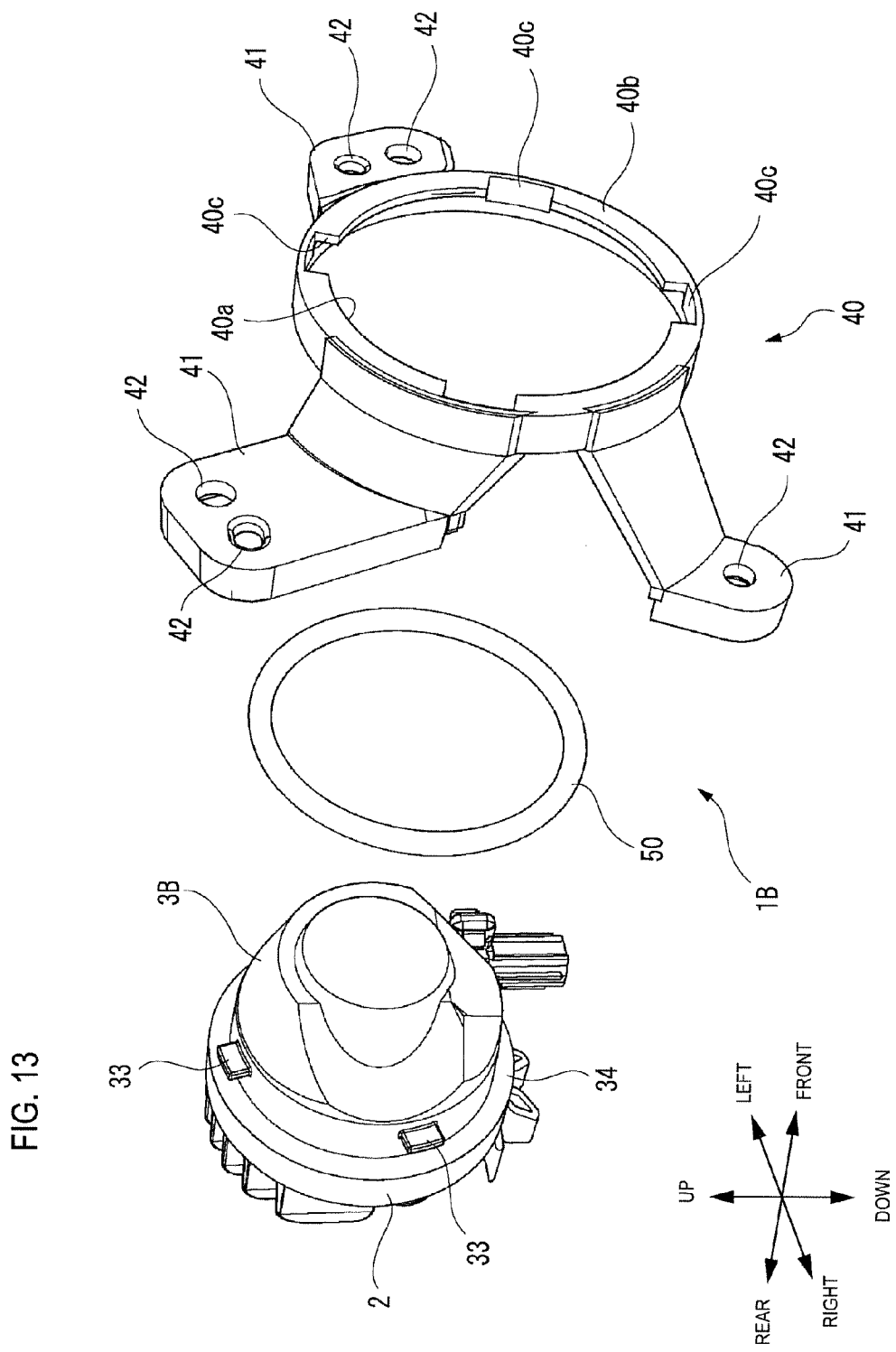
FIG. 13 is an exploded perspective view showing a third modification of the fog lamp shown in FIG. 1.

Next, a fog lamp 1B according to a third modification is described with reference to FIGS. 13 and 14. FIG. 13 is a perspective view of the fog lamp 1B which is partially exploded. The fog lamp 1B includes a translucent cover 3B, a bracket 40 and an O-ring 50.

The translucent cover 3B is mounted to the housing 2, thereby defining the lamp chamber 4. The translucent cover 3B has a plurality of engaging protrusions 33 (an example of the engaging part). The configuration regarding the housing 2 is the same as in the fog lamps 1, 1A described above.

The bracket 40 has an annular frame body 40 which defines an opening 40a. A plurality of notches 40c is partially formed at the frame body 40. Each of the plurality of notches 40c is communicated with the opening 40a. The plurality of notches 40c is formed by the same number as the plurality of engaging protrusions 33.

The bracket 40 has three mounting members 41. Each base end of the three mounting members 41 is molded integrally with the frame body 40b. The three mounting members 41 extend to the side away from the frame body 40b. At least one opening 42 is formed at each leading end of the three mounting members 41.

Figure 14:
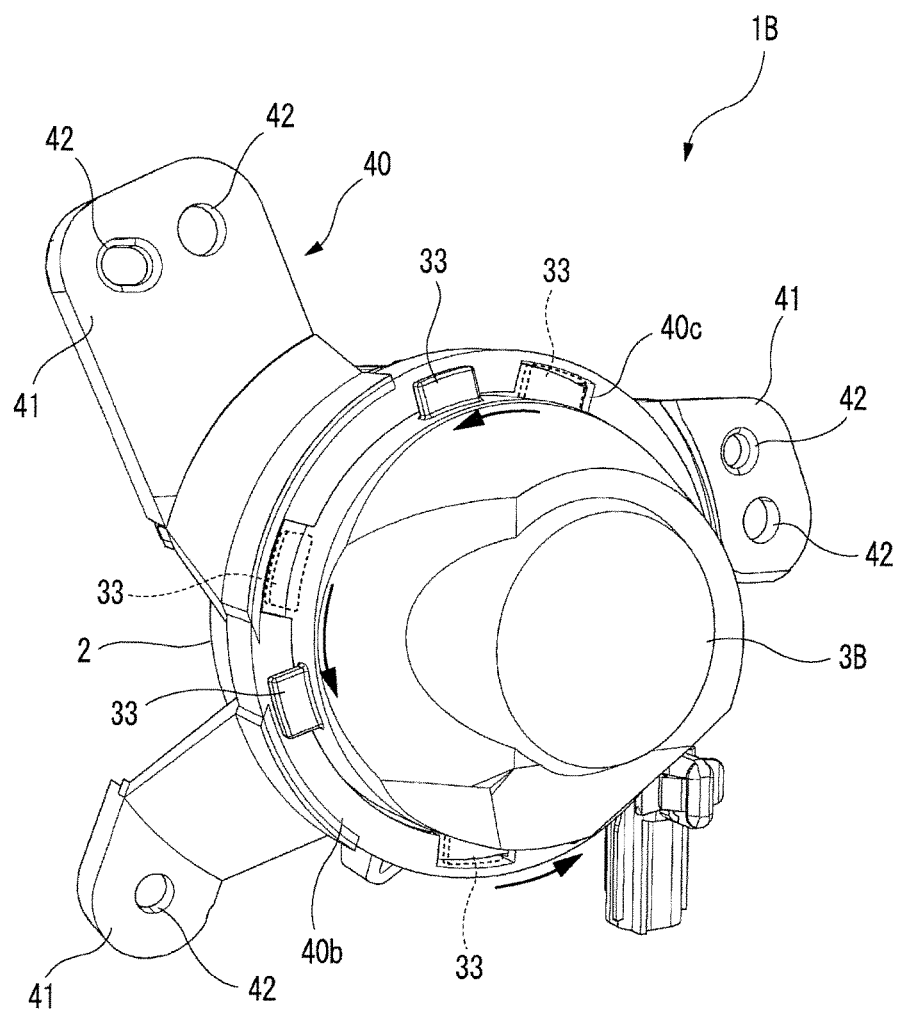
FIG. 14 is a perspective view showing the fog lamp shown in FIG. 13.

As shown in FIG. 14, the bracket 40 is mounted to the translucent cover 3B. Specifically, the plurality of notches 40c is respectively passed through the plurality of engaging protrusions 33. At this time, a main body of the translucent cover 3B passes through the opening 40a and protrudes to the front of the frame body 40b. When the plurality of engaging protrusions 33 reaches the front of the frame body 40b as indicated by a broken line in FIG. 14, at least one of the bracket 40 and the translucent cover 3B is twisted in order to move the plurality of engaging protrusions 33 in a counterclockwise direction. In this way, as indicated by a solid line in FIG. 14, the plurality of engaging protrusions 33 is engaged with the frame body 40b, and thus, the translucent cover 3B is prevented from coming out rearward from the bracket 40.

Each of the three mounting members 41 is fixed to the vehicle by fastening members inserted through the openings 42. At this time, each of the three mounting members 41 supports the housing 2 via the translucent cover 3B.

Namely, according to the configurations as described above, when the type, structure or design or the like of the vehicle to which the fog lamp 1B is mounted is changed, it is sufficient to change only the configuration of the bracket 40. Specifically, at least one of the number, shape and arrangement of the mounting members 41 and the design of the bracket 40 itself may be changed. In this case, since not only the more expensive housing 2 and the component group mounted to the housing 2 can be shared and generalized but also the translucent cover 3B can be shared and generalized, an increase in component cost and manufacturing cost can be suppressed.

A structure of engaging the translucent cover 3B to the frame body 40b is not limited to the above-described embodiments. A locking structure such as a lance structure or a bayonet structure can be appropriately employed, so long as it can prevent the translucent cover 3B from coming out rearward from the frame body 40b.

When the bracket 40 is mounted to the translucent cover 3B, the O-ring 50 shown in FIG. 13 is sandwiched between the bracket 40 and the translucent cover 3B. The O-ring 50 is an annular member having elasticity. An inner diameter of the O-ring 50 is greater than that of the opening 40a and is disposed at a peripheral edge portion 34 of the translucent cover 3B.

According to this configuration, when the mounting members 41 of the bracket 40 are fixed to a vehicle body by fastening members (not shown), the O-ring 50 (an example of the buffering member) serves as a buffering material for absorbing the stress which is applied to the translucent cover 3B via the frame body 40b. Therefore, in an operation of fixing the bracket 40 to the vehicle, it is possible to prevent the translucent cover 3B from being cracked due to the stress generated by the tightening of the fastening member. As a result, not only an increase in component cost and manufacturing cost can be suppressed, but also workability is improved.

The buffering member sandwiched between the bracket 40 and the translucent cover 3B is not limited to the O-ring 50. A buffering member such as a rubber pad or a gasket can be appropriately employed, so long as it can buffer the stress which is applied to the translucent cover 3B via the bracket 40 by the tightening of the fastening members.

Next, a fog lamp 11 according to a second embodiment will be described with reference to FIGS. 15 to 19. The same or similar components will be denoted by the same reference numerals as those of the fog lamp 1 according to the first embodiment and a duplicated description thereof is omitted.

Figure 15:
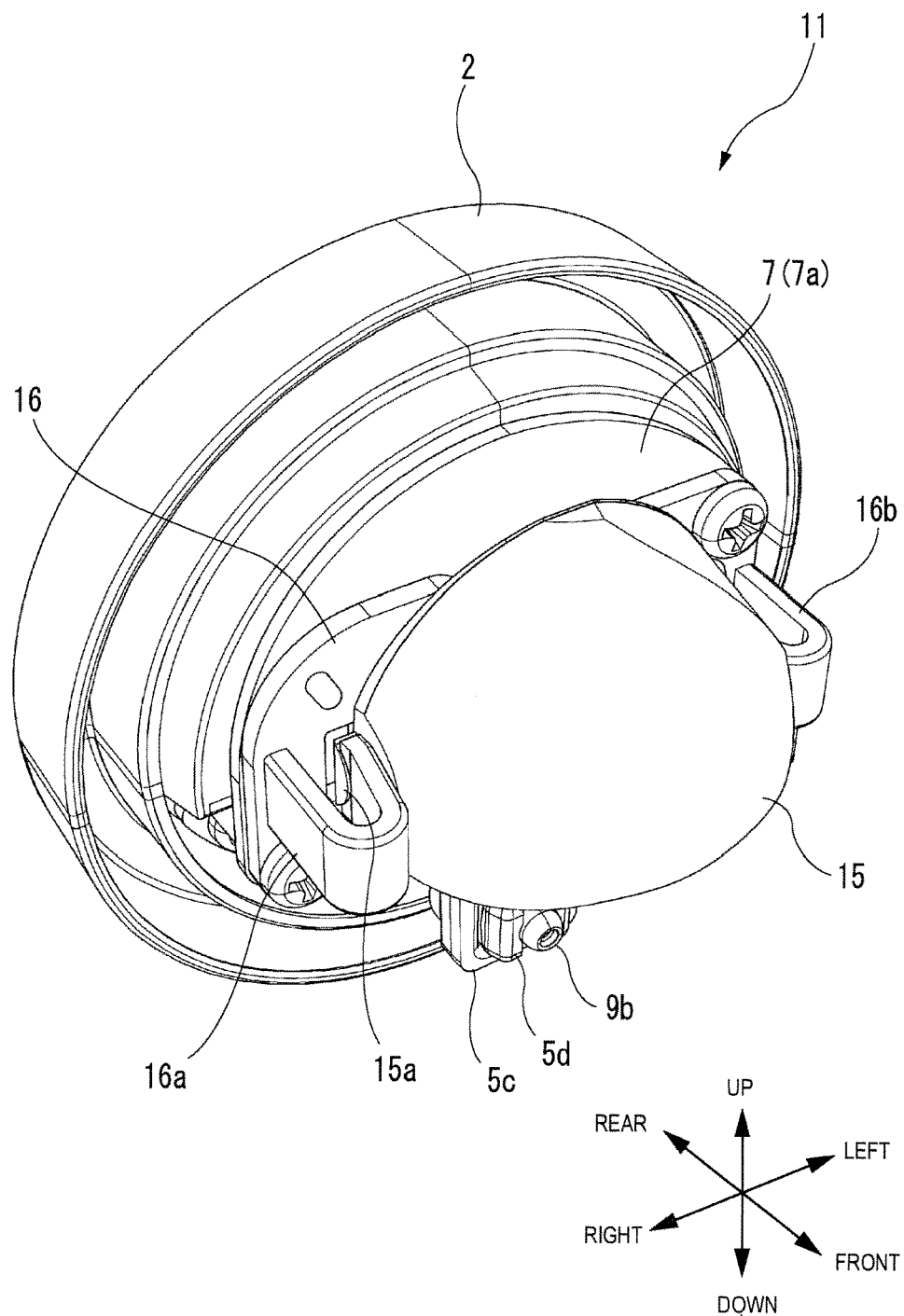
FIG. 15 is a perspective view showing a portion of a fog lamp according to a second embodiment.

FIG. 15 is a perspective view showing a portion of the fog lamp 11 in a state where the translucent cover 3 is removed, as seen from the right front upper side. The fog lamp 11 according to the second embodiment is different from the fog lamp 1 according to the first embodiment in the structure of the lens and the lens holder. The fog lamp 11 includes a projection lens 15 and a lens holder 16. The lens holder 16 holds the projection lens 15.

Figure 16:
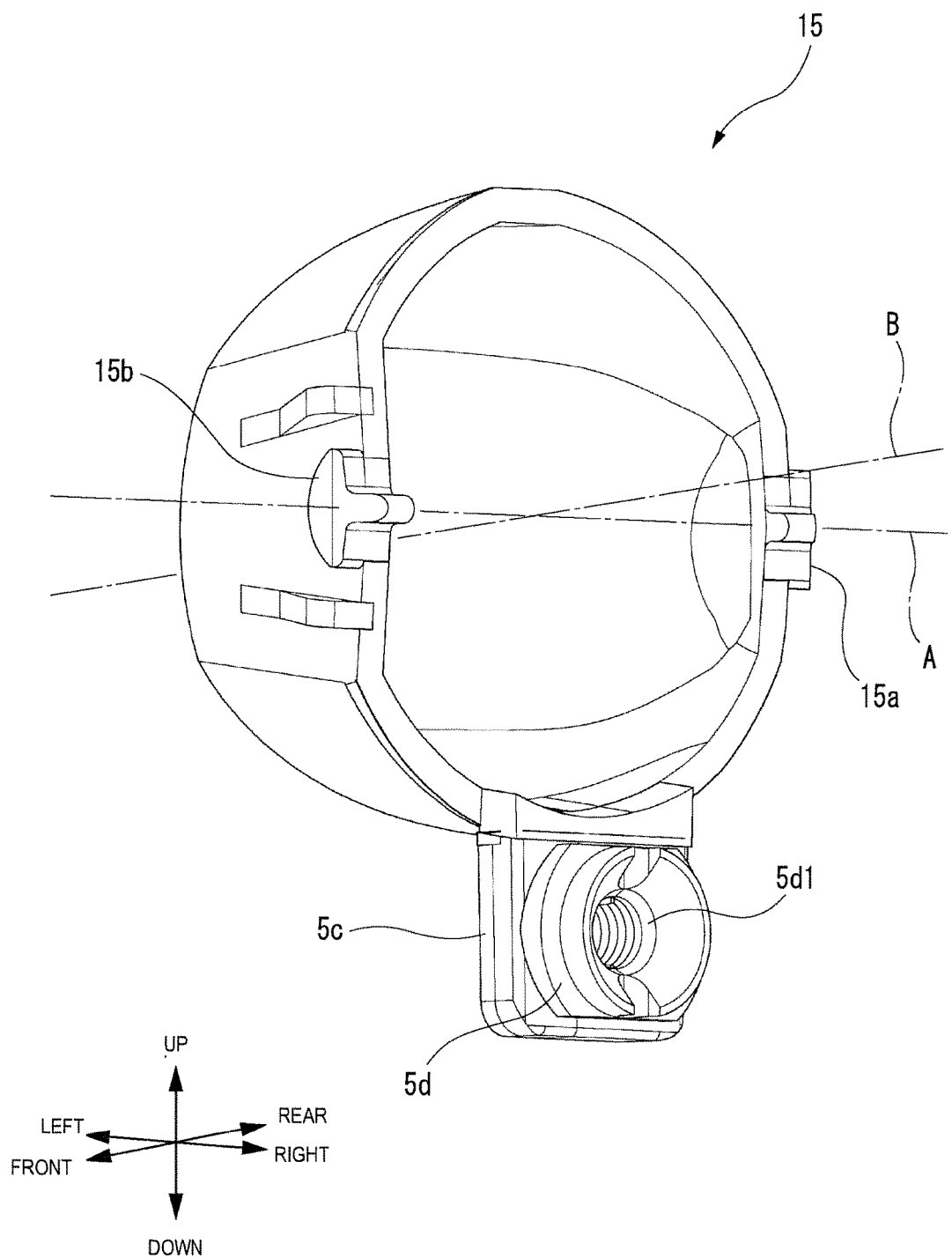
FIG. 16 is a perspective view showing a projection lens included in the fog lamp shown in FIG. 15.
Figure 17:
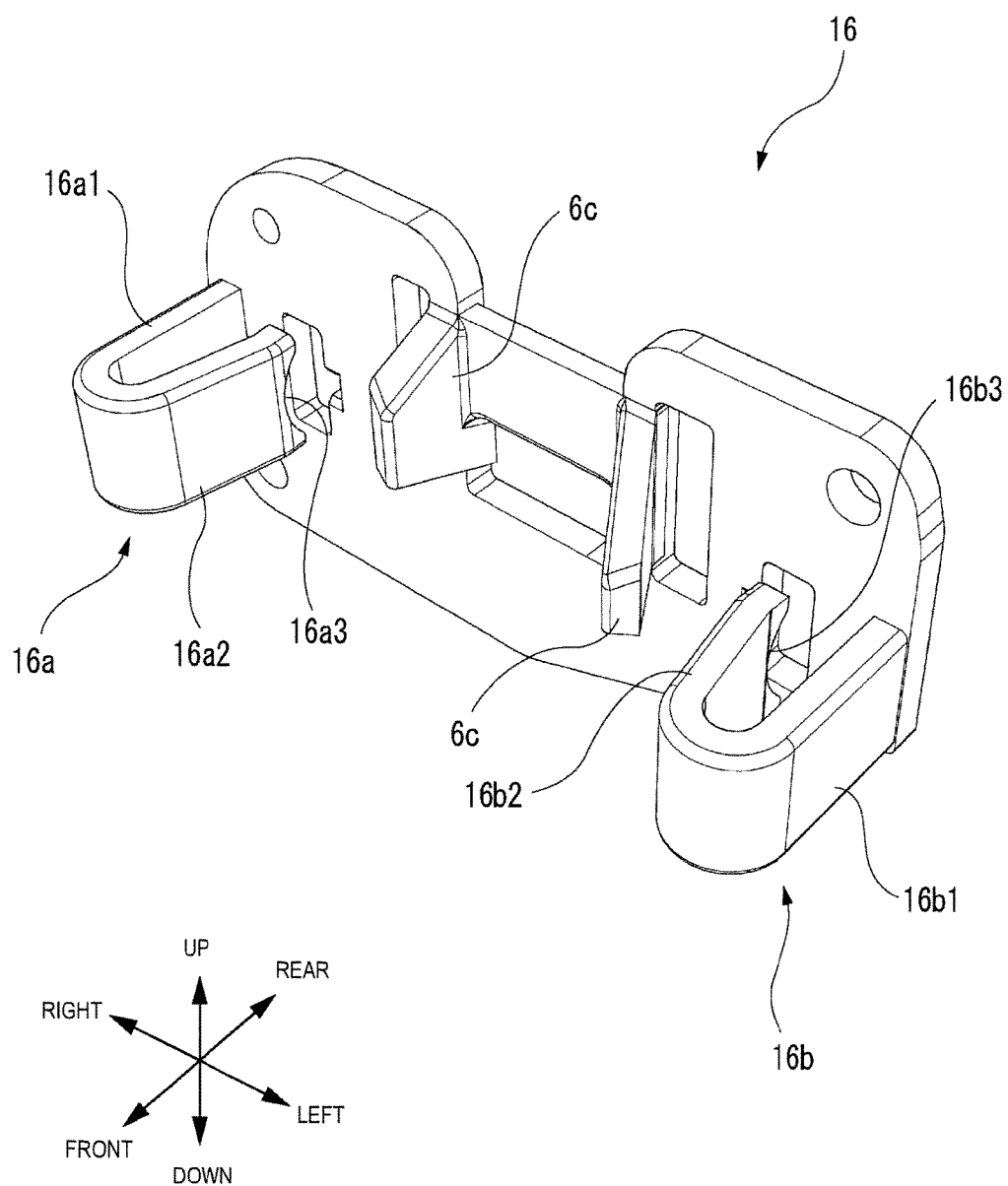
FIG. 17 is a perspective view showing a lens holder included in the fog lamp shown in FIG. 15.
Figure 18:
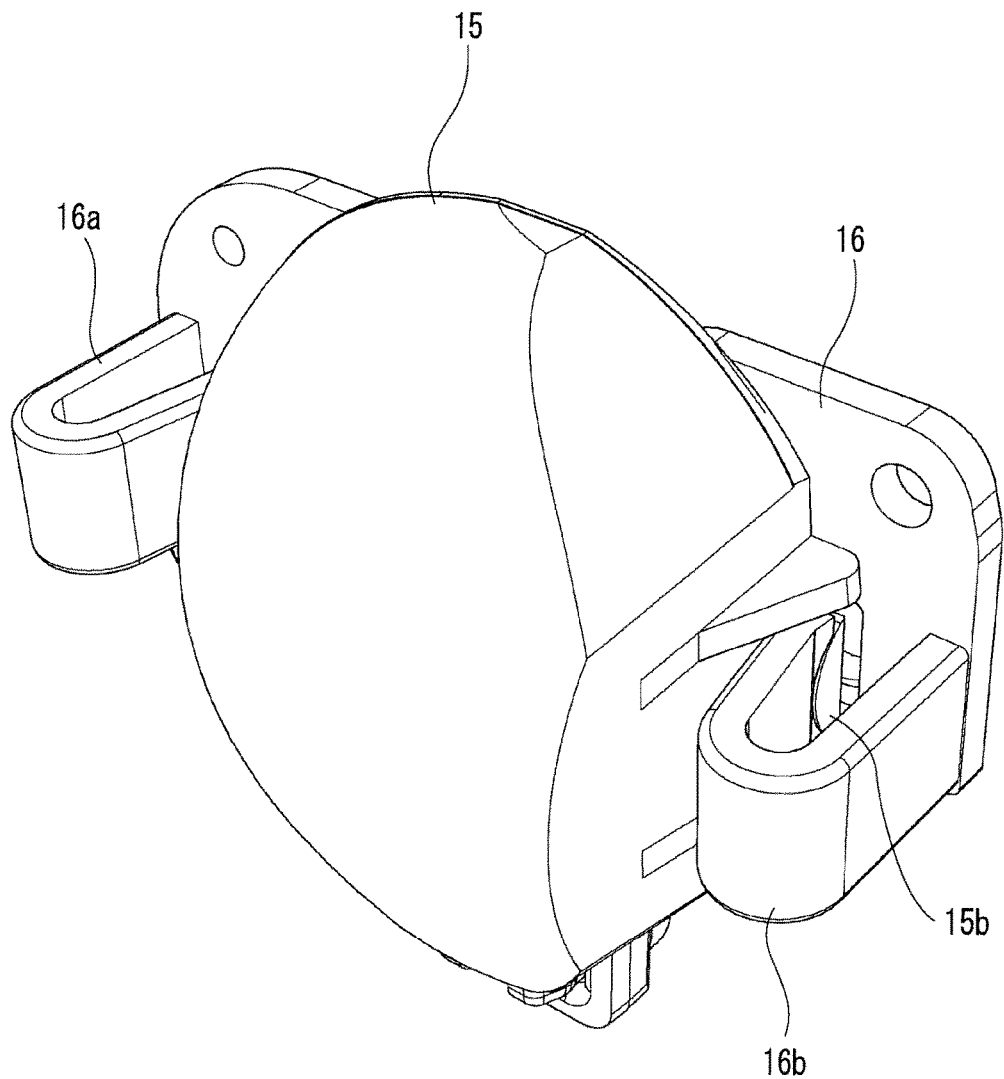
FIG. 18 is a perspective view showing a portion of the fog lamp shown in FIG. 15.

A structure of holding the projection lens 15 in the lens holder 16 will be described with reference to FIGS. 16 and 17. FIG. 16 is a perspective view showing an appearance of the projection lens 15, as seen from the left rear lower side. FIG. 17 is a perspective view showing an appearance of the lens holder 16, as seen from the left front upper side.

As shown in FIG. 16, the projection lens 15 includes a right pivot shaft 15a and a left pivot shaft 15b. The right pivot shaft 15a is disposed on the right side of the projection lens 15. The right pivot shaft 15a is formed to have a semi-cylindrical shape and a circumferential surface thereof faces the front side (see FIG. 15). The left pivot shaft 15b is disposed on the left side of the projection lens 15. The left pivot shaft 15b is formed to have a semi-cylindrical shape and a circumferential surface thereof faces the front side. An axial line A connecting the centers of the right pivot shaft 15a and the left pivot shaft 15b extends in a direction perpendicular to an optical axis B of the projection lens 15.

As shown in FIG. 17, the lens holder 16 includes a right bearing 16a and a left bearing 16b. The right bearing 16a and the left bearing 16b are provided on the front surface of the lens holder 16.

The right bearing 16a has a base portion 16a1, a flexible portion 16a2 and a curved receiving surface 16a3. The base portion 16a1 protrudes forward from the front surface of the lens holder 16. The flexible portion 16a2 extends to be curved to the left rear side continuously from a front end portion of the base portion 16a1. The flexible portion 16a2 can be slightly deflected and deformed to the right side. The curved receiving surface 16a3 is formed as a surface recessed forward in a rear end portion of the flexible portion 16a2. The curved receiving surface 16a3 faces the front surface of the lens holder 16 and has a shape along the circumferential surface of the right pivot shaft 15a.

The left bearing 16b has a base portion 16b1, a flexible portion 16b2 and a curved receiving surface 16b3. The base portion 16b1 protrudes forward from the front surface of the lens holder 16. The flexible portion 16b2 extends to be curved to the right rear side continuously from a front end portion of the base portion 16b1. The flexible portion 16b2 can be slightly deflected and deformed to the left side. The curved receiving surface 16b3 is formed as a surface recessed forward in a rear end portion of the flexible portion 16b2. The curved receiving surface 16b3 faces the front surface of the lens holder 16 and has a shape along the circumferential surface of the left pivot shaft 15b.

The projection lens 15 and the lens holder 16 having the configurations as described above are coupled to each other, as shown in FIGS. 15 and 18. At this time, the right pivot shaft 15a and the left pivot shaft 15b of the projection lens 15 are held in the right bearing 16a and the left bearing 16b of the lens holder 16, respectively.

Specifically, as the right pivot shaft 15a is pressed against the right bearing 16a, the right pivot shaft 15a enters a region located between the curved receiving surface 16a3 and the front surface of the lens holder 16 while deforming the flexible portion 16a2 to the right side. When the circumferential surface of the right pivot shaft 15a comes into contact with the curved receiving surface 16a3, the flexible portion 16a2 returns to its original position, thereby preventing the right pivot shaft 15a from coming out forward. In this way, within the region located between the curved receiving surface 16a3 and the front surface of the lens holder 16, the right pivot shaft 15a can be pivoted in a plane perpendicular to the axial line A shown in FIG. 16.

Similarly, as the left pivot shaft 15b is pressed against the left bearing 16b, the left pivot shaft 15b enters a region located between the curved receiving surface 16b3 and the front surface of the lens holder 16 while deforming the flexible portion 16b2 to the left side. When the circumferential surface of the left pivot shaft 15b comes into contact with the curved receiving surface 16b3, the flexible portion 16b2 returns to its original position, thereby preventing the left pivot shaft 15b from coming out forward. In this way, within the region located between the curved receiving surface 16b3 and the front surface of the lens holder 16, the left pivot shaft 15b can be pivoted in a plane perpendicular to the axial line A shown in FIG. 16.

As shown in FIG. 16, the projection lens 15 has the connection portion 5c and the joint 5d, similar to the projection lens 5 according to the first embodiment. As shown in FIG. 15, the shaft portion 9b of the aiming screw 9 is inserted into the through hole 5d1 of the joint 5d. Accordingly, when the head portion 9a of the aiming screw 9 is rotationally operated by a predetermined tool, the screwed position of the shaft portion 9b and the joint 5d is changed, and thus, the joint 5d is displaced in the longitudinal direction.

Namely, as described with reference to FIGS. 9A-9C, the aiming screw 9 and the joint 5d constitute an aiming mechanism for pivoting the projection lens 15 relative to the lens holder 16 about the right pivot shaft 15a and the left pivot shaft 15b. As the head portion 9a of the aiming screw 9 is rotationally operated, the shaft portion 9b is rotated. The joint 5d converts the rotation of the shaft portion 9b into a force for pivoting the projection lens 15. Thus, the reference position in the vertical direction of the optical axis B of the projection lens 15 can be regulated through the rotational operation of the aiming screw 9.

Also with the configurations as described above, the reference position of the optical axis B of the projection lens 15 is adjusted by directly pivoting the projection lens 15 held in the lens holder 16. Therefore, it is possible to suppress an increase in the size of the fog lamp 11 even while including the projection lens 15 and the aiming mechanism for performing the adjustment of the optical axis thereof.

Figure 19:
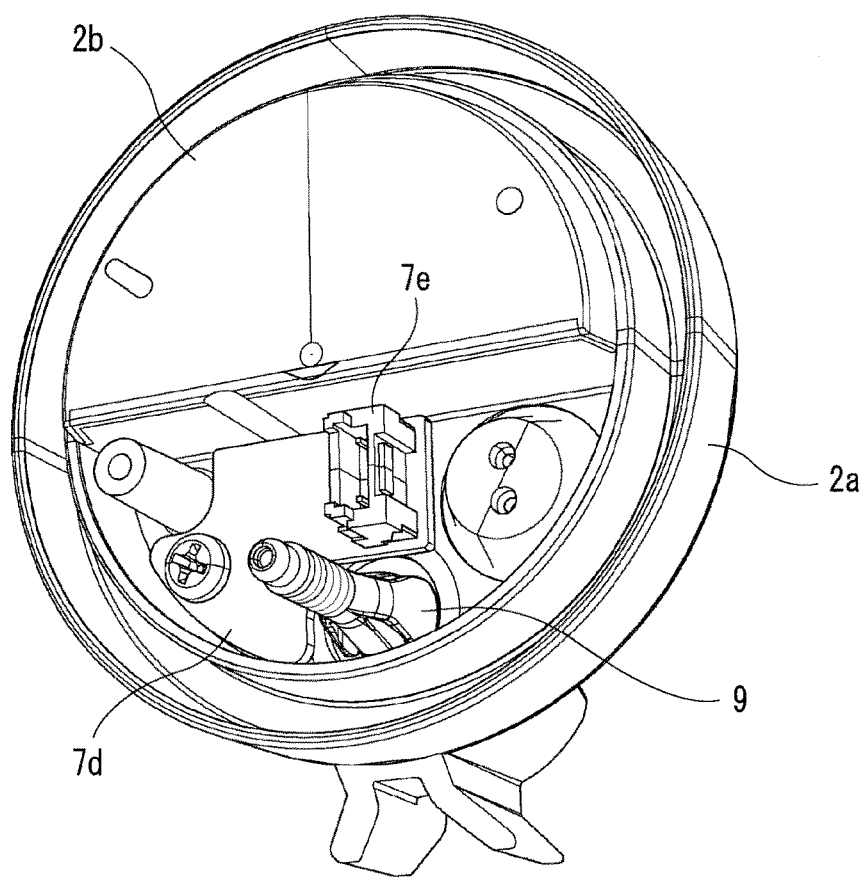
FIG. 19 is a perspective view showing a portion of the fog lamp shown in FIG. 15.
Figure 19:
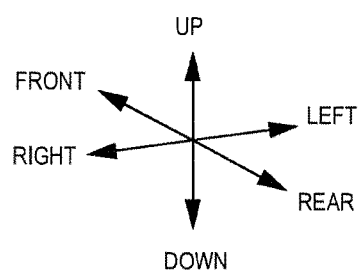

FIG. 19 is a perspective view showing a portion of the fog lamp 11 in which the projection lens 15, the lens holder 16 and the support board 7a of the light source unit 7 are removed from the state shown in FIG. 15, as seen from the left front lower side. In the second embodiment, the drive circuit board 7d of the light source unit 7 is disposed in a space below the support table 2b of the housing 2, i.e., in a space inside the lamp chamber 4 to which the aiming screw 9 is extended. The drive circuit board 7d is disposed such that a main surface faces the longitudinal direction.

Also with this configuration, a space which is required for the provision of the aiming screw 9 can be effectively utilized, thereby suppressing an increase in the size of the housing 2. Therefore, it is possible to suppress an increase in the size of the fog lamp 11 even while including the projection lens 15 and the aiming mechanism for performing the adjustment of the optical axis thereof.

The above description is not intended to limit the present invention, but are merely non-limiting examples intended to facilitate the understanding of the present invention. It is apparent that the above embodiments can be modified and improved without departing from the gist thereof, and the equivalents thereof are included in the present invention.

In one or more of the above-described embodiments, the right pivot shaft 5a (15a) and the left pivot shaft 5b (15b) are provided in the projection lens 5 (15), and the right bearing 6a (16a) and the left bearing 6b (16b) are provided in the lens holder 6 (16). Contrary to this configuration, the right pivot shaft and the left pivot shaft may be provided in the lens holder 6 (16), and the right bearing and the left bearing may be provided in the projection lens 5 (15).

In one or more of the above-described embodiments, the light emitting surface of the light source 7b is provided in arrangement to face the projection lens 5(15). According to this configuration, the distance between the light source 7b and the projection lens 5 (15) can be shortened. However, from the viewpoint of a degree of freedom in layout of an optical system, the orientation of the light emitting surface of the light source 7b can be appropriately determined, depending on the specification.

In one or more of the above-described embodiments, the fog lamp 1 (11) has been illustrated as an example of the lighting device. However, the present invention can be applied to various lighting devices in which a projection lens is included in a lamp chamber defined by a housing and a translucent cover and the adjustment for an optical axis of the projection lens is required.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A lighting device to be mounted on a vehicle, the lighting device comprising:
    a light source;
    a projection lens having an optical axis, and disposed so as to allow at least some of light emitted from the light source to pass therethrough;
    a holder that holds the projection lens;
    a pivot shaft provided at one of the projection lens and the holder and extending in a direction intersecting with the optical axis of the projection lens;
    a bearing provided at the other of the projection lens and the holder and that holds the pivot shaft; and
    an aiming mechanism configured to pivot the projection lens relative to the holder about the pivot shaft,
    wherein the projection lens comprises a connection portion and a joint,
    wherein the aiming mechanism comprises a screw, a head portion of the screw, and the joint,
    wherein the connection portion is molded integrally with a lower portion of the projection lens and extends downward form the lower portion, and
    wherein the projection lens is a single integrally-molded piece.

2. The lighting device according to claim 1, further comprising:
    a housing defining a portion of a lamp chamber for accommodating the light source, the projection lens, the pivot shaft, and the bearing,
    wherein the head portion of the screw of the aiming mechanism can be rotationally operated on an outside of the housing; and
    wherein the joint converts the rotation of the screw into a force for pivoting the projection lens about the pivot shaft.

3. The lighting device according to claim 2, further comprising:
    a circuit board having a circuit configured to control the turning on/off of the light source,
    wherein the screw is extended through a portion of the housing, and
    wherein at least a portion of the circuit board is disposed in a space inside the lamp chamber to which the screw is extended.

4. The lighting device according to claim 3,
    wherein the screw is extended in a longitudinal direction of the vehicle, and
    wherein the circuit board is disposed such that at least a portion of a main surface faces the screw.

5. The lighting device according to claim 4, further comprising:
    a reflector configured to reflect the light emitted from the light source in a predetermined direction,
    wherein the reflector is provided in the holder, and
    wherein the position of the holder to the light source is fixed.

6. The lighting device according to claim 3, further comprising:
    a reflector configured to reflect the light emitted from the light source in a predetermined direction,
    wherein the reflector is provided in the holder, and
    wherein the position of the holder to the light source is fixed.

7. The lighting device according to claim 2, further comprising:
    a reflector configured to reflect the light emitted from the light source in a predetermined direction,
    wherein the reflector is provided in the holder, and
    wherein the position of the holder to the light source is fixed.

8. The lighting device according to claim 2, wherein a light emitting surface of the light source faces the projection lens.

9. The lighting device according to claim 1, further comprising:
    a reflector configured to reflect the light emitted from the light source in a predetermined direction,
    wherein the reflector is provided in the holder, and
    wherein the position of the holder to the light source is fixed.

10. The lighting device according to claim 1, wherein a light emitting surface of the light source faces the projection lens.

11. The lighting device according to claim 1, wherein an entirety of the projection lens is translucent.

12. The lighting device according to claim 1, wherein an entirety of the light source is disposed within the holder.

* * * * *